US012651208B2

(12) United States Patent
Zhang et al.

(10) Patent No.: US 12,651,208 B2
(45) Date of Patent: Jun. 9, 2026

(54) DATA SUBSAMPLING FOR RECOMMENDATION SYSTEMS

(71) Applicant: Lemon Inc., Grand Cayman (KY)

(72) Inventors: Aonan Zhang, Los Angeles, CA (US); Jiankai Sun, Los Angeles, CA (US); Ruocheng Guo, London (GB); Taiqing Wang, Los Angeles, CA (US); Xiaohui Chen, Los Angeles, CA (US)

(73) Assignee: Lemon Inc., Grand Cayman (KY)

( * ) Notice: Subject to any disclaimer, the term of this patent is extended or adjusted under 35 U.S.C. 154(b) by 789 days.

(21) Appl. No.: 18/070,461

(22) Filed: Nov. 28, 2022

(65) Prior Publication Data

US 2023/0098656 A1 Mar. 30, 2023

(51) Int. Cl.
*G06N 20/20* (2019.01)

(52) U.S. Cl.
CPC .................................... *G06N 20/20* (2019.01)

(58) Field of Classification Search
CPC ... G06F 16/9024; G06F 16/9535; G06N 3/09; G06N 20/20
See application file for complete search history.

(56) References Cited

U.S. PATENT DOCUMENTS

| | | | | |
|---|---|---|---|---|
| 2022/0405588 | A1* | 12/2022 | Kumar | G06N 3/063 |
| 2023/0076083 | A1* | 3/2023 | Mishra | G06F 18/2148 |
| 2023/0222182 | A1* | 7/2023 | Gottin | G06F 18/211 |
| | | | | 706/12 |

OTHER PUBLICATIONS

Alexander et al.; "Fundamentals of Electric Circuits"; McGraw-Hill Higher Education; 2007 (book).
Cai et al.; "Graph Coarsening with Neural Networks"; Int'l Conf. on Learning Representations; arXiv:2102.01350; Feb. 2021; 26 pages.
Chandra et al.; "The electrical resistance of a graph captures its commute and cover times"; Proceedings of the $21^{st}$ Annual Symposium on Theory Computing; Computational Complexity; vol. 6(4)I 1996; 29 pages.
Chawla et al.; "Data Mining for Imbalanced Datasets: An Overview"; Data Mining and Knowledge Discovery Handbook; 2009; p. 853-867.
Chen et al.; "On Sampling Strategies for Neural Network-based Collaborative Filtering"; $23^{rd}$ ACM SIGKDD Int'l Conf. on Knowledge Discovery and Data Mining; Aug. 2017; 14 pages.
Cheng et al.; "Wide & Deep Learning for Recommender Systems"; 1st Workshop on Deep Learning for Recommender Systems; Sep. 2016; p. 7-10.
Chung; "Spectral Graph Theory"; CBMS; vol. 92; 1997 (book).
(Continued)

*Primary Examiner* — Grace Park
(74) *Attorney, Agent, or Firm* — BakerHostetler

(57) ABSTRACT

The present disclosure describes techniques for improving data subsampling for recommendation systems. A user-item graph associated with training data may be constructed. An importance of user-item interactions may be estimated via graph conductance based on the user-item graph. An importance of the training data may be measured via sample hardness using a pre-trained pilot model. A subsampling rate may be generated based on the importance estimated from the user-item graph and the importance measured by the pre-trained pilot model.

18 Claims, 19 Drawing Sheets

300

302

304

| idx | $G_{eff}(\cdot,\cdot)$ |
|---|---|
| 1 | 0.18 |
| 2 | 0.21 |
| 3 | 0.68 |
| 4 | 0.39 |
| 5 | 0.12 |

- - - - negative edges $(G = 0)$ ——— positive edges $(G = 1)$

(56) References Cited

OTHER PUBLICATIONS

Ding et al.; "Simplify and Robustify Negative Sampling for Implicit Collaborative Filtering"; Advances in Neural Information Processing Systems 33; 2020; p. 1094-1105.

Fithian et al.; "Local Case-Control Sampling: Efficient Subsampling in Imbalanced Data Sets"; Annals of Statistics; vol. 42(5); Oct. 2014; p. 1693-1724.

Gao et al.; "KuaiRec: A Fully-observed Dataset and Insights for Evaluating Recommender Systems"; Human Computer Interaction; arXiv:2202.10842; Aug. 2022; 11 pages.

Ghosh et al.; "Minimizing Effective Resistance of a Graph"; SIAM Review; vol. 50 No. 1; 2008; p. 37-66.

Guo et al.; "DeepFM: A Factorization-Machine based Neural Network for CTR Prediction"; Information Retrieval; arXiv:1703.04247; Mar. 2017; 8 pages.

Hamann et al.; "Structure-preserving sparsification methods for social networks"; Social Network Analysis and Mining; vol. 6; Jan. 2016; 19 pages.

Han et al.; "Local uncertainty sampling for large-scale multiclass logistic regression"; The Annals of Statistics; vol. 48(3); 2020; p. 1770-1788.

Harary et al.; "Some properties of line digraphs"; Rendiconti del Circolo Matematico di Palermo; vol. 9; 1960; p. 161-168.

He et al.; "Neural Factorization Machines for Sparse Predictive Analytics"; $40^{th}$ Int'l ACM SIGIR Conf. on Research and Development in Information Retrieval; Aug. 2017; p. 355-364.

Horvitz et al.; "A Generalization of Sampling Without Replacement from a Finite Universe"; Journal of the American Statistical Association; vol. 47; Dec. 1952; p. 663-685.

Huang et al.; "Embedding-based Retrieval in Facebook Search"; 26th ACM SIGKDD Int'l Conf. on Knowledge Discovery & Data Mining; Aug. 2020; p. 2553-2561.

Huang et al.; "Combining Label Propagation and Simple Models Out-performs Graph Neural Networks"; Social and Information Networks; arXiv:2010.13993; Nov. 2020; 19 pages.

Jia et al.; "Residual Correlation in Graph Neural Network Regression"; $26^{th}$ ACM SIGKDD Int'l Conf. on Knowledge Discovery & Data Mining; Aug. 2020; p. 588-598.

Le, M. Can; "Edge sampling using local network information"; The Journal of Machine Learning Research; vol. 22; 2021; 29 pages.

Liu et al.; "AutoFIS: Automatic Feature Interaction Selection in Factorization Models for Click-Through Rate Prediction"; $26^{th}$ ACM SIGKDD Int'l Conf. on Knowledge Discovery & Data Mining; Jul. 2020; p. 2636-2945.

Nocaj et al.; "Untangling Hairballs"; Int'l Symposium on Graph Drawing; Sep. 2014; 12 pages.

Robinson et al.; "Contrastive Learning with Hard Negative Samples"; Machine Learning; arXiv:2010.04592; 2020; 28 pages.

Satuluri et al.; "Local graph sparsification for scalable clustering"; ACM SIGMOD Int'l Conf. on Management of Data; 2011; p. 721-732 (Abstract Only).

Sculley et al.; "Hidden Technical Debt in Machine Learning Systems"; Advances in Neural Information Processing Systems 28; 2015; 9 pages.

Shahin et al.; "Continuous Integration, Delivery and Deployment: A Systematic Review on Approaches, Tools, Challenges and Practices"; IEEE Access; vol. 5; 2017; p. 3909-3943.

Spielman et al.; "Graph sparsification by effective resistances"; 14th Annual ACM Symposium on Theory of Computing; 2008; 16 pages.

Staudt et al.; "Networkit: A tool suite for large-scale complex network analysis"; Network Science; vol. 4(4); 2016; 21 pages.

Ting et al.; "Optimal Subsampling with Influence Functions"; $32^{nd}$ Conf. on Advances in Neural Information Processing Systems 31; 2018; 10 pages.

Wan et al.; "Graph Sparsification via Meta-Learning"; Advancement of Artificial Intelligence; 2021; 5 pages.

Wang H.; "Logistic Regression for Massive Data with Rare Events"; 37th International Conference on Machine Learning; vol. 119; 2020; p. 9829-9836.

Wang et al.; "Nonuniform Negative Sampling and Log Odds Correction with Rare Events Data"; $35^{th}$ Conf. Advances in Neural Information Processing Systems 34; 2021; p. 19847-19859.

Wu et al.; "MIND: A Large-Scale Dataset for News Recommendation"; 58th Annual Meeting of the Association for Computational Linguistics; Jul. 2020; p. 3597-3606.

Wu et al.; "Noise Contrastive Estimation for One-Class Collaborative Filtering"; $42^{nd}$ Int'l ACM SIGIR Conf. on Research and Development in Information; Jul. 2019; p. 135-144.

Ying et al.; "Graph Convolutional Neural Networks for Web-Scale Recommender Systems"; $24^{th}$ ACM SIGKDD Int'l Conf. on Knowledge Discovery & Data Mining; Jun. 2018; p. 974-983.

Zhang et al.; "Optimizing top-n collaborative filtering via dynamic negative item sampling"; $36^{th}$ Int'l ACM SIGR Conf. on Research and Development Information Retrieval; Aug. 2013; p. 785-788.

Zheng et al.; "Robust Graph Representation Learning via Neural Sparsification"; 37th International Conference on Machine Learning; vol. 119; 2020; p. 11458-11468.

Zhou et al.; "Learning with Local and Global Consistency"; Advances in Neural Information Processing Systems 16; 2003; 8 pages.

* cited by examiner

102

| idx | user | item | context | click |
|-----|------|------|---------|-------|
| 1 | $u_1$ | $v_1$ | | 1 |
| 2 | $u_2$ | $v_1$ | | 1 |
| 3 | $u_1$ | $v_2$ | | 1 |
| 4 | $u_2$ | $v_2$ | | 0 |
| 5 | $u_3$ | $v_2$ | | 0 |
| ⋮ | ⋮ | ⋮ | ⋮ | ⋮ |

| idx | $G_{\text{eff}}(\cdot, \cdot)$ |
|-----|------|
| 1 | 0.21 |
| 2 | 0.25 |
| 3 | 0.74 |
| 4 | 0.36 |
| 5 | 0.15 |

504

| idx | $\hat{p}$ |
|-----|------|
| 1 | 0.29 |
| 2 | 0.91 |
| 3 | 0.45 |
| 4 | 0.24 |
| 5 | 0.26 |

506

500

502

| idx | user | item | context | click | $\pi$ |
|---|---|---|---|---|---|
| 1 | $u_1$ | $v_1$ | ... | 1 | 0.29 |
| 2 | $u_2$ | $v_1$ | ... | 1 | 0.91 |
| 3 | $u_1$ | $v_2$ | ... | 1 | 0.74 |
| 4 | $u_2$ | $v_2$ | ... | 0 | 0.36 |

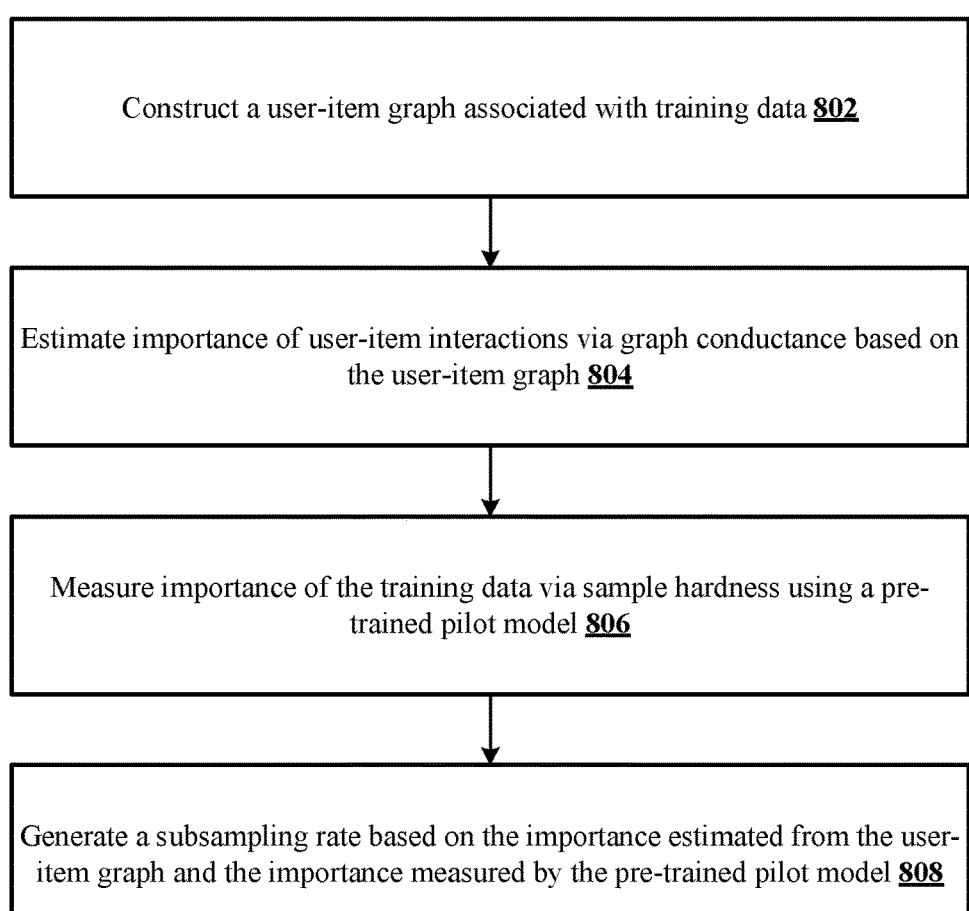

Construct a user-item graph associated with training data 802

Estimate importance of user-item interactions via graph conductance based on the user-item graph 804

Measure importance of the training data via sample hardness using a pre-trained pilot model 806

Generate a subsampling rate based on the importance estimated from the user-item graph and the importance measured by the pre-trained pilot model 808

FIG. 8

900
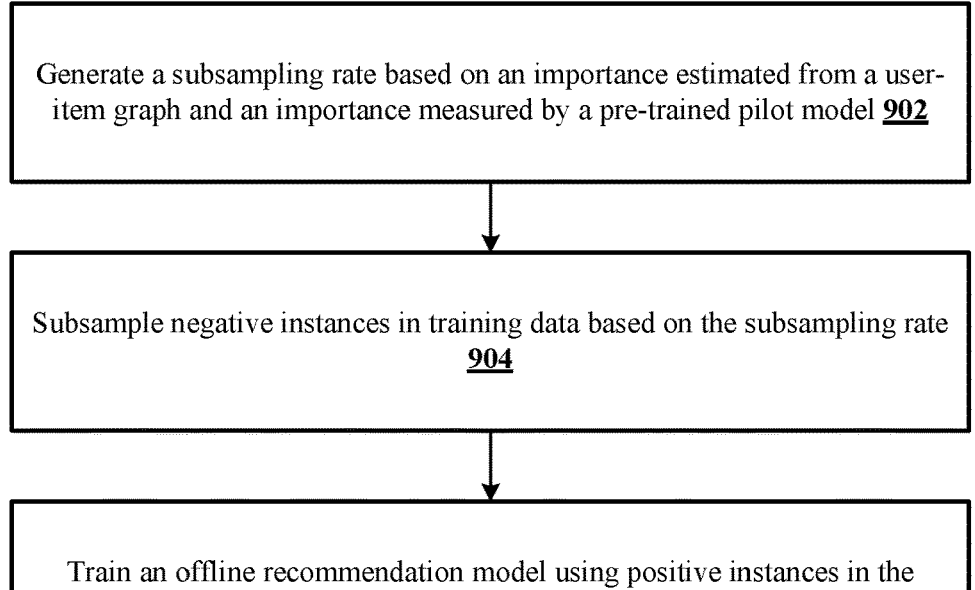
Generate a subsampling rate based on an importance estimated from a user-item graph and an importance measured by a pre-trained pilot model 902
Subsample negative instances in training data based on the subsampling rate 904
Train an offline recommendation model using positive instances in the training data and the subsampled negative instances 906
FIG. 9

1000

Construct a bipartite graph from training data, wherein the bipartite graph comprises positive edges and negative edges, the positive edges corresponding to positives instances in the training data, and the negative edges corresponding to negative instances in the training data 1002

Estimate a hardness score associated with each of the negative instances by calculating an effective conductance corresponding to each negative edge 1004

Smooth the hardness score associated with each of the negative instances using graph propagation 1006

Determine an average effective conductance associated with neighboring negative edges of each negative edge 1102

Calculate, for each negative edge, a weighted sum of the average effective conductance and a corresponding effective conductance 1104

Figure 12:
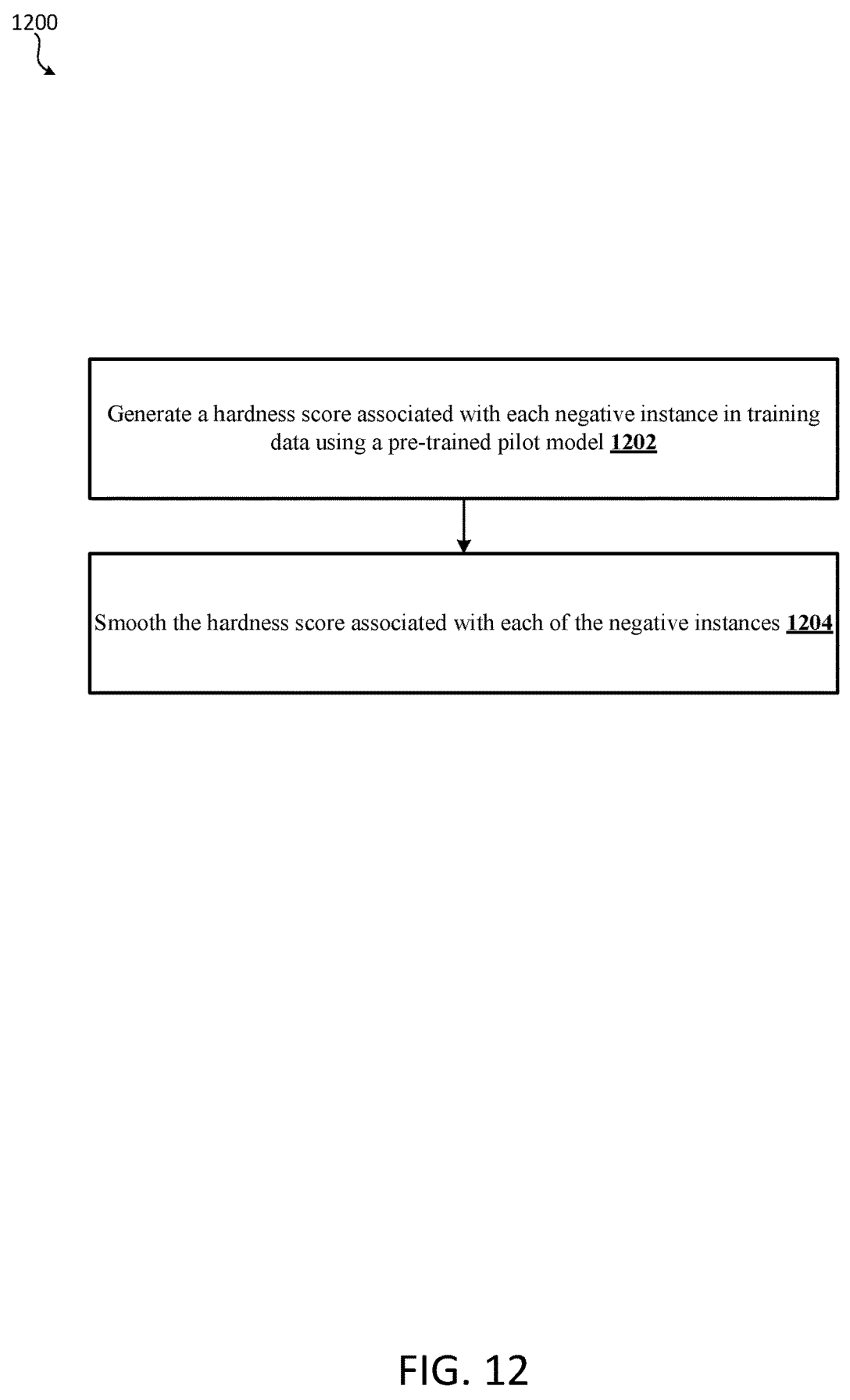

1200

Generate a hardness score associated with each negative instance in training data using a pre-trained pilot model 1202

Smooth the hardness score associated with each of the negative instances 1204

Determine a final hardness score associated with each negative instances in the training data based on a corresponding smoothed hardness score determined based on the user-item graph and a corresponding smoothed hardness score determined by the pre-trained pilot model 1302

Generate a subsampling rate of the negative instances in the training data based on the final hardness score associated with each of the negative instances 1304

DATA SUBSAMPLING FOR RECOMMENDATION SYSTEMS

BACKGROUND

Machine learning models are increasingly being used across a variety of industries to perform a variety of different tasks. Such tasks may include making predictions or recommendations about data. Improved techniques for utilizing machine learning models are desirable.

BRIEF DESCRIPTION OF THE DRAWINGS

The following detailed description may be better understood when read in conjunction with the appended drawings. For the purposes of illustration, there are shown in the drawings example embodiments of various aspects of the disclosure; however, the invention is not limited to the specific methods and instrumentalities disclosed.

FIG. 7 shows an example subsampled set of training data in accordance with the present disclosure.

FIG. 8 shows an example process for improving data subsampling of recommendation systems in accordance with the present disclosure.

FIG. 9 shows an example process for improving data subsampling of recommendation systems in accordance with the present disclosure.

FIG. 10 shows an example process for improving data subsampling of recommendation systems in accordance with the present disclosure.

FIG. 12 shows an example process for improving data subsampling of recommendation systems in accordance with the present disclosure.

FIG. 13 shows an example process for improving data subsampling of recommendation systems in accordance with the present disclosure.

DETAILED DESCRIPTION OF ILLUSTRATIVE EMBODIMENTS

Figure 1:
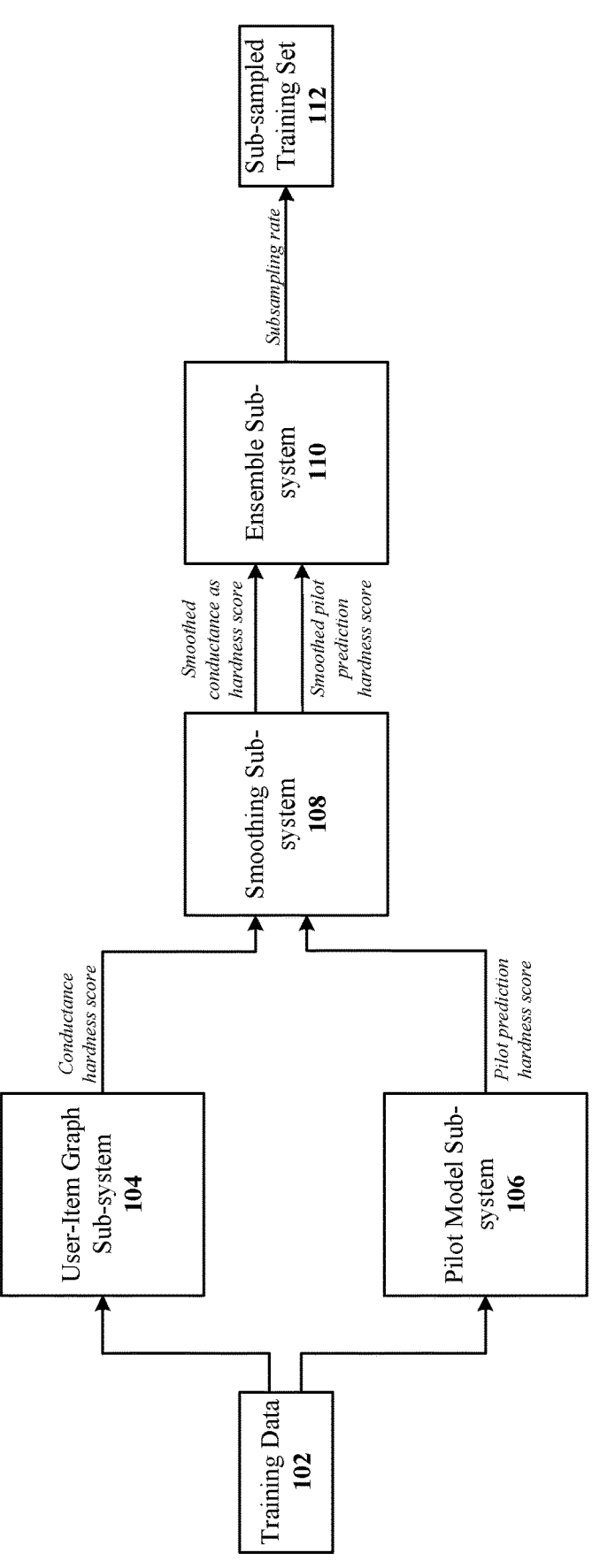
FIG. 1 shows an example system that may be used in accordance with the present disclosure.

Recommendation systems may learn user preferences through user-item interactions (e.g., user clicks on various items). For example, a user click may be considered as a positive sample that indicates the user's interest in the clicked item. Conversely, if a user does not click on an item, such as a no-click may be considered as a negative sample. Clickthrough rate (CTR) prediction models may be configured to output click probabilities of user-item pairs, and such probabilities may be used to rank recommended items for a user in response to a user request. Such CTR models may be trained using data collected from online platforms, where "no-click" user-item pairs dominate. Due to this imbalance of the training dataset, negative sampling may be performed. Negative sampling may down-samples negative samples. Down-sampling negative samples may significantly reduce model training costs.

In embodiments, instead of treating all data points as equally important, non-uniform data subsampling aims to retain more informative samples (and ignore less informative samples). Previous techniques for non-uniform data subsampling utilize a pilot model to assess the importance of data. When the pilot model is correctly pre-trained, one can achieve an optimal sampling rate. Such pilot-model techniques may be configured to measure the importance of data using pilot prediction scores together with first and second-order derivatives of a loss function. As optimal negative sampling rates are proportional to the pilot model's prediction score, a high sampling rate may indicate an inaccurate model prediction. The sampling strategy may be interpreted as using hard negative samples (HNS).

Model-based sampling algorithms may not be applicable in real-life scenarios. A real-life recommendation system may deploy data subsampling in response to a user initiating a request to an online serving model. The user may receive recommendations returned by a server. If the user clicks a particular recommended item, then a positive instance associated with that recommended item may be collected. Otherwise, if the user does not click a particular recommended item within a period of time, a negative instance associated with that recommended item may be collected. A pilot prediction score and other statistics may be recorded in each instance to calculate a sampling rate for the data subsampling. All instances may be filtered by a data subsampling module before input/output (I/O) to reduce the I/O and network bandwidth bottleneck. One or more offline models may be trained with historical data before being deployed online. However, for model-based methods, because subsampling rates are determined by online models, such subsampling rates may be sub-optimal for offline training purposes. When the model trained offline using such subsampling rates is deployed online, data subsampling is affected. As a result, inconsistent subsampling rates may be produced.

In these real-life scenarios, two unavoidable obstacles to the application of model-based sampling exist. First, offline model training is vulnerable to model misspecification. Model misspecification may cause inferior results. Unfortunately, model misspecification is persistent due to an online-offline discrepancy, especially in continuous integration and deployment (CI/CD) in real systems. Second, the coupling of data subsampling and model training introduces extra dependencies across system modules. Such extra dependencies may increase system maintenance cost and cause extra technical debt. Thus, techniques for improving data subsampling of recommendation systems are needed.

Described here are techniques for improving data subsampling of recommendation systems using model-agnostic data subsampling methods. The topology of a user-item graph may be used to estimate the importance of each user-item interaction (an edge in the user-item graph), such as via graph conductance. After the importance of each user-item interaction is estimated, a propagation step may be performed to smooth out the estimated importance values. As the techniques described herein are model agnostic, the merits of both model agnostic and model-based subsampling methods may be combined in certain embodiments.

FIG. 1 illustrates an example data subsampling system 100 that may be used in accordance with the present disclosure. The system 100 may comprise a user-item graph sub-system 104, a pilot model sub-system 106, a smoothing sub-system 108, and an ensemble sub-system 110. The system 100 may be configured to generate a subsampling rate that may be used to sample a set of training data for training an offline recommendation model.

The user-item graph sub-system 104 may be configured to receive a set of training data 102. The set of training data 102 may be associated with user-item interactions. The set of training data 102 may comprise a plurality of positive instances and a plurality of negative instances. For example, if a user interacted with (e.g., clicked) a particular item, then a positive instance associated with that item may be collected. Otherwise, if the user did not click a particular item within a period of time, a negative instance associated with that item may be collected.

For example, the system 100 may be configured to solve a binary classification problem, where $$D = \{(x_n, y_n)\}_{n=1}^{N}$$

is a training set (e.g., set of training data 102) of size N, and $x_n$ and $y_n$ are the feature vector and label of instance n, respectively. The generalized logistic regression (GLM) model, where the target model corresponds to the offline model (before deployment) may be represented as $$f(x; \theta) := p(y = 1 \mid x, \theta) = \frac{1}{1 + e^{-g(x;\theta)}},$$

where the log-odd g(x; θ) is implemented by a predictive model. $N_0$ may denote the number of negative instances and $N_1 = N - N_0$ may denote the number of positive instances in the set of training data 102. The set of training data 102 may be imbalanced, in that the number of negative instances may greatly outnumber the number of positive instances (e.g., $N_0 \gg N_1$).

Figure 2:
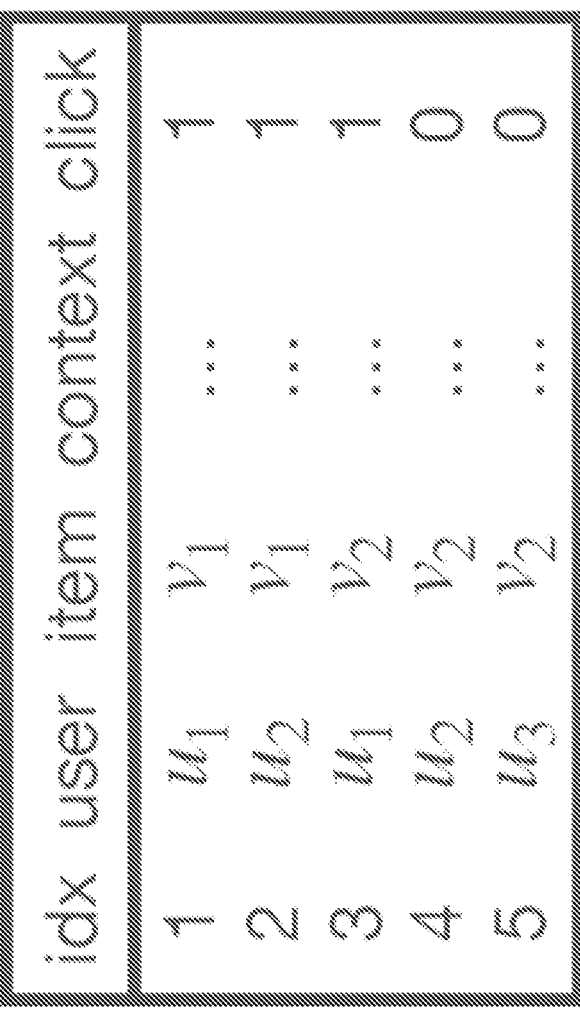
FIG. 2 shows an example set of training data in accordance with the present disclosure.

FIG. 2 shows the set of training data 102 in more detail. As shown in the example of FIG. 2, the set of training data 102 comprises five instances. The first three instances in the set of training data 102 are positive instances. For example, the first instance indicates that the user $u_1$ clicked on the item $v_1$. The second instance indicates that the user $u_2$ clicked on item $v_1$. The third instance indicates that the user $u_1$ clicked on item $v_2$. The last two instances in the set of training data 102 are negative instances. For example, the fourth instance indicates that the user $u_2$ clicked on the item $v_2$. The fifth instance indicates that the user $u_3$ clicked on item $v_2$. While the set of training data 102 shown in the example of FIG. 2 only includes five instances, it should be appreciated that the number of instances in the set of training data 102 may include a much larger number of instances, such as hundreds, thousands, or millions of instances. The number of negative instances in the set of training data 102 may greatly outnumber the number of positive instances in the set of training data 102.

Referring back to FIG. 1, as information is sparsely distributed over a large number of negative instances, negative sampling may be used to reduce the dataset size and to boost training efficiency. A negative sampling algorithm may be configured to weigh each negative instance with some measurement of its importance. For example, the measure of importance for a negative instance x may be represented as π(x). The importance for a negative instance may be used as the negative sampling rate of the negative instance.

In embodiments, the measure of importance may be assigned to a negative instance by exploiting "hard negative samples." Sampling rates may be proportional to non-negative hardness scores h(•):

$$\pi(x_n) \propto h(x_n), \text{ s.t. } \sum_{n=1}^{N_0} \pi(x_n) = N_0 \alpha \qquad \text{Equation 1}$$

where $\alpha \in (0, 1]$ is a pre-set average subsampling rate of negative instances. An online pilot model $\tilde{f}(•)$ may equal f(•; θ*). For example, the online pilot model may have the same functional form as the target model, and θ* may be the true parameter. Thus, a model-based hardness score $h_b(x_n) = \tilde{f}(x_n) = f(x_n; \theta^*)$ may be set to get a near-optimal sampling rate $\pi(x_n)$ by Equation 1. A negative instance predicted with a higher score by the pilot model $\tilde{f}(•)$ is more "surprising" and thus is harder for the target model f(•; θ). For a positive instance, π(x) may be used to denote its counterfactual negative sampling rate. The hard negative sampling procedure may be demonstrated as follows:

Given $\{(x_n, y_n)_{n=1}^{N}\}$ and hardness score function h(•)
Compute the counterfactual negative sampling rate $\pi(x_n)$ via Equation 1
for n=1, ..., N do
   Generate $\lambda_n \sim U(0,1)$.
   if $y_n=1$ or $y_n \leq \pi(x_n)$ then
      Include $\{x_n, y_n, \pi(x_n)\}$ in the training set.
   end if
end for Since data distribution shifts after subsampling, the log odds may be corrected to get an unbiased estimation:

$$\hat{\theta} = \arg\max_{\theta} \sum_{n=1}^{N} \delta_n \left[ y_n g\pi(x_n; \theta) - \log\left(1 + e^{g(x_n;\theta) - l_n}\right) \right] \qquad \text{Equation 2}$$

where $\delta_n \in \{0, 1\}$ is the subsampling indicator and $l_n := \log \pi(x_n)$. Log odds correction may be more efficient than the inverse probability weighting estimator. However, when the pilot model is misspecified, optimal negative sampling with pilot models may not be achieved. As described above, deploying model-based hard negative sampling methods may be error prone, as model misspecification problems persistently exist due to online-offline model discrepancy and continuous integration and deployment.

Thus, a model-agnostic hardness score $h_a(\bullet)$ may be utilized to maintain a scalable and sustainable data subsampling service. In the binary classification problem described above, each feature $x_n=(u_{i_n}, v_{j_n}, c_n)$, where $c_n$ represents context features and the label of instance n is $y_n$. The model-agnostic hardness score $h_a(\bullet)$ of negative samples may be determined without referring to a pilot model.

To determine the model-agnostic hardness $h_a(\bullet)$ of negative samples without referring to a pilot model, sample hardness may be related to graph topology. The user-item graph sub-system 104 may be configured to generate a user-item bipartite graph based on the set of training data 102. The user-item bipartite graph may comprise two sets of nodes. One of the two sets of nodes may represent users and the other of the two sets of nodes may represent items. The user-item bipartite graph may comprise edges, with each edge representing interactions between a user node and an item node. For example, the user-item bipartite graph may be represented as (U, V, E), where the node set $$U = \{u_i\}_{i=1}^M$$

represents M users, the node set $$V = \{v_j\}_{j=1}^Q$$

represents Q items, and the edge set $$E = \{(u_{i_n}, v_{j_n})\}_{n=1}^N$$

represents N user-item pairs. For each node pair n, $y_n \in \{0, 1\}$ represents whether there is a positive interaction between $u_{i_n}$ and $v_{j_n}$.

In embodiments, the user-item graph sub-system 104 may be configured to determine an effective conductance associated with the edges in the user-item bipartite graph. The edges of the user-item bipartite graph may be treated as instances for subsampling. In the context of the bipartite graph, hard negative sampling may be performed using the concept of effective conductance.

For example, the user-item bipartite graph may be imagined as an electricity network, where each edge $(u_{i_n}, v_{j_n})$ is a conductor with conductance $G(u_{i_n}, v_{j_n})$. The conductance measures the edge's ability to transfer "electrical current." $G(u_{i_n}, v_{j_n})$ may be large when a user $u_{i_n}$ expresses direct preference of item $v_{j_n}$. In particular, $G(u_{i_n}, v_{j_n})$ may be set to equal $y_n$. Thus, the conductance may be equal to one if there is a direct preference, and the conductance may be equal to zero if there is not a direct preference expressed. The effective conductance $G_{eff}(u_{i_n}, v_{j_n})$ between $u_{i_n}$ and $v_{j_n}$ may represent the network's ability to transfer "current" from $u_{i_n}$ to $v_{j_n}$ (or vice versa). The effective conductance $G_{eff}(u_{i_n}, v_{j_n})$ is the reciprocal of effective resistance $R_{eff}(u_{i_n}, v_{j_n})$. $G_{eff}(u_{i_n}, v_{j_n})$ and $R_{eff}(u_{i_n}, v_{j_n})$ may be defined as follows:

$$R_{eff}(u_{i_n}, v_{j_n}) = (e[u_{i_n}] - e[v_{j_n}])^T L^+ (e[u_{i_n}] - e[v_{j_n}]), \quad \text{Equation 3}$$

$$G_{eff}(u_{i_n}, v_{j_n}) = \frac{1}{R_{eff}(u_{i_n}, v_{j_n})}$$

where $e[\bullet] \in \{0, 1\}^{M+Q}$ is the one-hot encoding of a node in the user-item bipartite graph, and $L^+$ is the pseudo inverse of the Laplacian of the user-item bipartite graph. If there are many conductible paths between $u_{i_n}$ and $v_{j_n}$, then the effective conductance $G_{eff}(u_{i_n}, v_{j_n})$ may be large.

Figure 3:
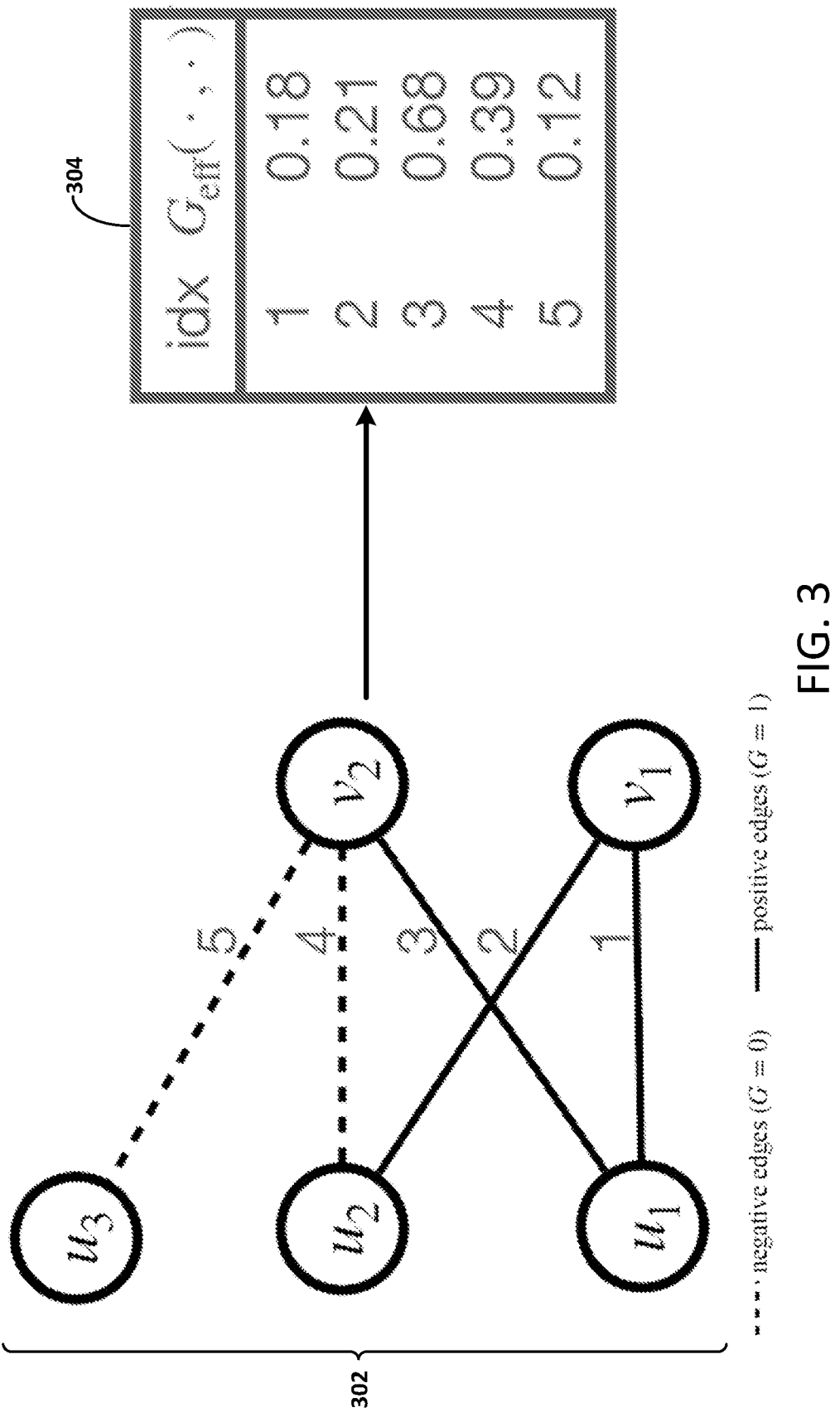
FIG. 3 shows an example framework for estimating importance of user-item interactions in accordance with the present disclosure.

FIG. 3 shows an example framework 300 for interpreting effective conductance on a bipartite graph 302. The bipartite graph 302 may comprise two sets of nodes. One set of nodes $\{u_1, u_2, u_3\}$ may represent users and the other set of nodes $\{v_1, v_2\}$ may represent items. The user-item bipartite graph may comprise edges (labeled 1-5), with each of the five edges representing interactions between a user node and an item node. For example, the edge labeled 1 represents an interaction between user node $u_1$ and item node $v_1$. The edge labeled 2 represents an interaction between user node $u_2$ and item node $v_1$. The edge labeled 3 represents an interaction between user node $u_1$ and item node $v_2$. The edge labeled 4 represents an interaction between user node $u_2$ and item node $v_2$. The edge labeled 5 represents an interaction between user node $u_3$ and item node $v_1$. The positive edges (labeled 1-3) may indicate that the corresponding user clicked on the corresponding item, while the negative edges (labeled 4-5) may indicate that the corresponding user did not click on the corresponding item (such as within a certain time frame).

The effective conductance associated with each edge in the user-item bipartite graph 302 may be determined. The table 304 of FIG. 3 shows the effective conductance associated with each of the five edges in the user-item bipartite graph 302. For example, the table 304 shows that the edge labeled 1 has an effective conductance of 0.18. The edge labeled 2 has an effective conductance of 0.21. The edge labeled 3 has an effective conductance of 0.68. The edge labeled 4 has an effective conductance of 0.39. The edge labeled 5 has an effective conductance of 0.12.

For example, each of the positive edges may be assigned a conductance G=1, and all negative edges may be assigned a conductance G=0. The user-item pair $(u_2, v_2)$ may have an effective conductance $G_{eff}(u_2, v_1)=\frac{1}{3}$ and the user-item pair $(u_3, v_2)$ may have an effective conductance $G_{eff}(u_3, v_2)=0$. Effective conductance may demonstrate user preference. A 3-hop path exists between $u_2$ and $v_2$ ($u_2 \rightarrow v_1 \rightarrow u_1 \rightarrow v_2$), but no path exists between $u_3$ and $v_2$. Thus, $u_3$ may prefer $v_2$ more than $u_2$ prefers $v_2$. The user item pair $(u_2, v_2)$, which is represented by a negative edge, may correspond to a harder negative sample than $(u_3, v_2)$, which is also represented by a negative edge.

Referring back to FIG. 1, sample hardness may be estimated via effective conductance. Effective conductance positively relates to sample hardness. The hardness score may be defined as:

$$h_a(x_n) = G_{eff}(u_{i_n}, v_{j_n}) - G(u_{i_n}, v_{j_n}) \quad \text{Equation 4}$$

for a negative sample, $G(u_{i_n}, v_{j_n})=0$. The effective conductance $G_{eff}(u_{i_n}, v_{j_n})$ may be high when there are multiple high-conductance paths from $u_{i_n}$ to $v_{j_n}$, demonstrating a user's indirect preference to the item. When the indirect preference is high but $(u_{i_n}, v_{j_n})$ turns out to be negative, the instance may be identified as a hard negative sample. For a positive sample, $h_a(x_n)$ denotes its counterfactual hardness score by subtracting the direct conductor $G(u_{i_n}, v_{j_n})$ from $G_{eff}(u_{i_n}, v_{j_n})$ to eliminate the prior information given by the label. The hardness score may be used to calculate the counterfactual negative sampling rate for log odds correction in Equation 2. Positive samples may not be dropped.

In embodiments, the direct calculation of effective conductance may be time-consuming. Instead of directly calculating effective conductance, the commute time distance comm(u, v) may first be approximated through random walk using scientific computing tools. Then the transformation $G_{eff}(u, v)=2|E|/comm(u, v)$ may be used to convert the commute time into effective conductance.

Figure 4:
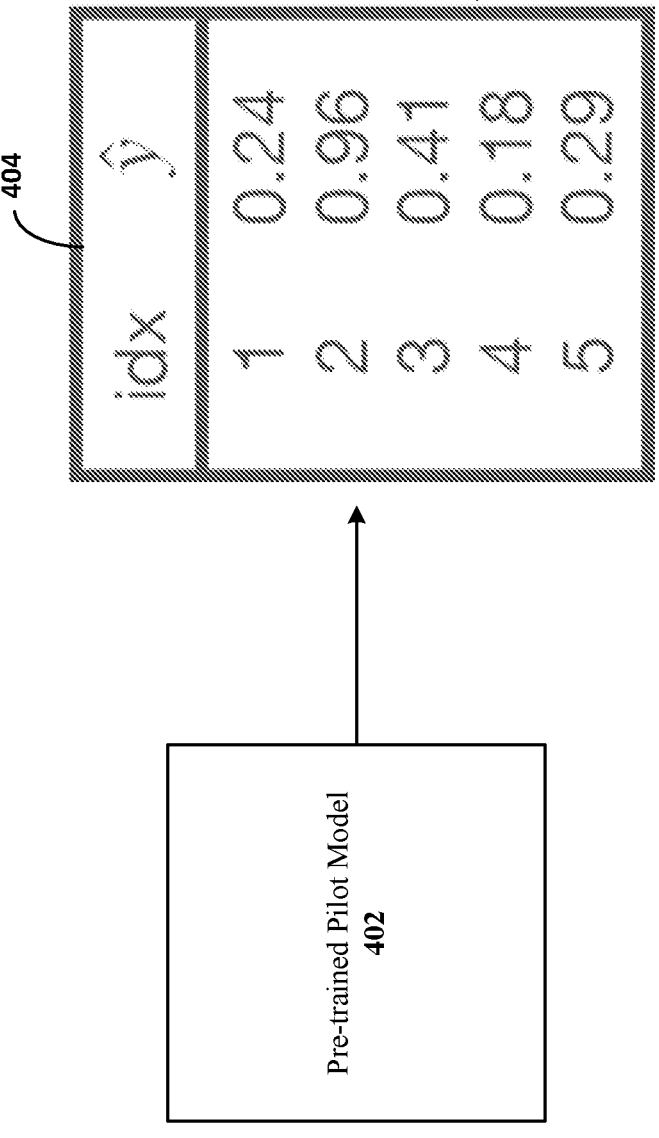
FIG. 4 shows an example framework for measuring importance of training data using a pre-trained pilot model in accordance with the present disclosure.

Some hard instances may be overlooked by model-agnostic methods. For example, estimating sample hardness via effective conductance in the manner described above (e.g., a model-agnostic method) may cause some hard instances to be overlooked. The hard instances that may be overlooked by model-agnostic methods may be captured by model-based methods, such as by a pre-trained pilot model. In embodiments, the pilot model sub-system 106 may be configured to determine a pilot prediction as a hardness score. In the example framework 400 depicted in FIG. 4, the pilot model sub-system 106 may cause a pre-trained pilot model 402 to generate a pilot prediction as a hardness score for each user-item pair. The table 404 of FIG. 4 shows the pilot prediction as a hardness score for each user-item pair in the set of training data 102. For example, the table 404 shows that the user-item pair $(u_1, v_1)$ has a pilot hardness score of 0.24. The user-item pair $(u_2, v_1)$ has a pilot hardness score of 0.96. The user-item pair $(u_1, v_2)$ has a pilot hardness score of 0.41. The user-item pair $(u_2, v_2)$ has a pilot hardness score of 0.18. The user-item pair $(u_3, v_2)$ has a pilot hardness score of 0.29.

Referring back to FIG. 1, in embodiments, the smoothing subsystem 108 may be configured to smooth hardness scores. The smoothing subsystem 108 may be configured to smooth hardness scores associated with both model-agnostic and model-based methods. The smoothing subsystem 108 may be configured to smooth hardness scores associated with both model-agnostic and model-based methods based on a line graph transformation of the user-item bipartite graph and graph propagation.

In embodiments, smoothing the hardness scores associated with the model-agnostic methods may comprise smoothing the hardness score associated with each of the negative instances. Smoothing the hardness score associated with each of the negative instances may comprise determining an average effective conductance associated with neighboring negative edges of each negative edge. Then, for each negative edge, a weighted sum of the average effective conductance and a corresponding effective conductance may be calculated. The weighted sum may be equal to the final model-agnostic hardness score for that negative edge.

Figure 5:
FIG. 5 shows an example framework for smoothing hardness scores in accordance with the present disclosure.

As shown in the example framework 500 of FIG. 5, the smoothing subsystem 108 may generate a line-graph transformation 502 of the user-item bipartite graph (e.g., the graph 302). The smoothing subsystem 108 may use the line-graph transformation 502 of the user-item bipartite graph to smooth the model-agnostic hardness scores (e.g., the effective conductance scores shown in the table 304 of FIG. 3). The table 504 shows the smoothed model-agnostic hardness scores (e.g., final model-agnostic hardness scores) generated by the smoothing subsystem 108. Likewise, the smoothing subsystem 108 may use the line-graph transformation 502 of the user-item bipartite graph to smooth the model-based hardness scores (e.g., the pilot prediction as hardness scores shown in the table 404 of FIG. 4). The table

506 shows the smoothed model-based hardness scores (e.g., final model-based hardness scores) generated by the smoothing subsystem 108.

To smooth the hardness scores associated with both model-agnostic and model-based methods, the smoothing subsystem 108 may utilize graph propagation techniques. The edge effective conductance derived from the graph may be noisy, thus leading to an inaccurate estimation of hardness scores. Graph propagation may be used to smooth the hardness score. Edge propagation may be reduced to node propagation by transforming the user-item bipartite graph (U, V, E) into its corresponding line graph $L(U, V, E)=(V_L, E_L)$, where $V_L=E$ and $E_L$ is the collection of edge pairs that share the same node.

In embodiments, the model-agnostic hardness scores may be smoothed by propagating uncertainty.

$$G_{eff} := G_{eff}(u_{i_n}, v_{j_n})_{n=1}^N \in R^N \text{ and } Y := (y_n)_{n=1}^N \in \{0, 1\}^N$$

may be denoted as the vector of the effective conductance scores and edge labels, respectively. The effective conductance $G_{eff}$ may be normalized as the estimated score Z and the uncertainty score B may be calculated as the absolute residual between Z and Y:

$$Z = \frac{G_{eff} - \min(G_{eff})}{\max(G_{eff}) - \min(G_{eff})}, B = |Y - Z|. \qquad \text{Equation 5}$$

The min-max normalization may be used to restrict the hardness score to be within the range [0, 1]. It may be denoted that $$S = D_L^{-1/2} A_L D_L^{-1/2},$$

where $A_L$ and $D_L$ are the adjacency matrix and the degree matrix of the line graph, respectively. The uncertainty may be smoothed by solving the following optimization problem:

$$\hat{B} = \underset{W}{\text{argmin}} \ tr(W^T(I - S)W) + \mu\|W - B\|_F^2. \qquad \text{Equation 6}$$

The first term in Equation 6 restricts the difference of uncertainties in neighboring nodes. The second term in Equation 6 constrains the smoothed uncertainty to be close to the initial uncertainty, with the coefficient $\mu$ controlling the strength of the constraint. With the smoothed uncertainty vector $\hat{B}$, the hardness estimation may be corrected by reversing Equation 5.

$$\hat{Z}=Y+(-1)^Y\hat{B} \qquad \text{Equation 7}$$

An iterative approximation approach may be used. If $\gamma=1/(1+\mu)$ and $B^{t+1}=(1-\gamma)B+\gamma SB^t$, $B^0=B$, then $B^t \to \hat{B}$ when $t \to \infty$. However, this iterative approach is not scalable as the transformed line graph has $|E_L|=(\Sigma_{u_i \in U}Deg(u_i)^2+\Sigma_{v_j \in V}Deg(v_j)^2)/2-N$ edges in total, where $Deg(\bullet)$ represents node degree. Alternatively, edge uncertainty may be directly propagated along the original graph (U, V, E), which only contains $|E|=(\Sigma_{u_i \in U}Deg(u_i)+\Sigma_{v_j \in V}Deg(v_j)/2-N$ edges in total. The propagation rule over edges is as follows:

$$B_n^{t+1} = (1-\gamma)B_n + \gamma\frac{m^t(u_{i_n}) + m^t(v_{j_n}) - 2Z_n}{Deg(u_{i_n}) + Deg(v_{j_n}) - 2},$$

where $$m^t(u) = \sum_{n:u=u_{i_n}} B_n^t, \; m^t(v) = \sum_{n:v=v_{j_n}} B_n^t, \; B_n^0 = B_n.$$

Using message passing mechanisms, the aggregated uncertainty $m^t(u)$ may be stored in u and then the uncertainty $B^{t+1}$ may be updated by applying the rule above.

In embodiments, the hardness scores associated with both model-agnostic and model-based methods may be smoothed by propagating scores. Instead of propagating uncertainty, we can directly propagate the scores $\hat{Z}$ by iterating $Z^{t+1} = (1-\gamma)\hat{Z} + \gamma SZ^t$, $Z^0 = \hat{Z}$ until convergence. After obtaining the final hardness scores, the final hardness scores may be rescaled to match the average subsampling rates $\alpha$.

Figure 6:
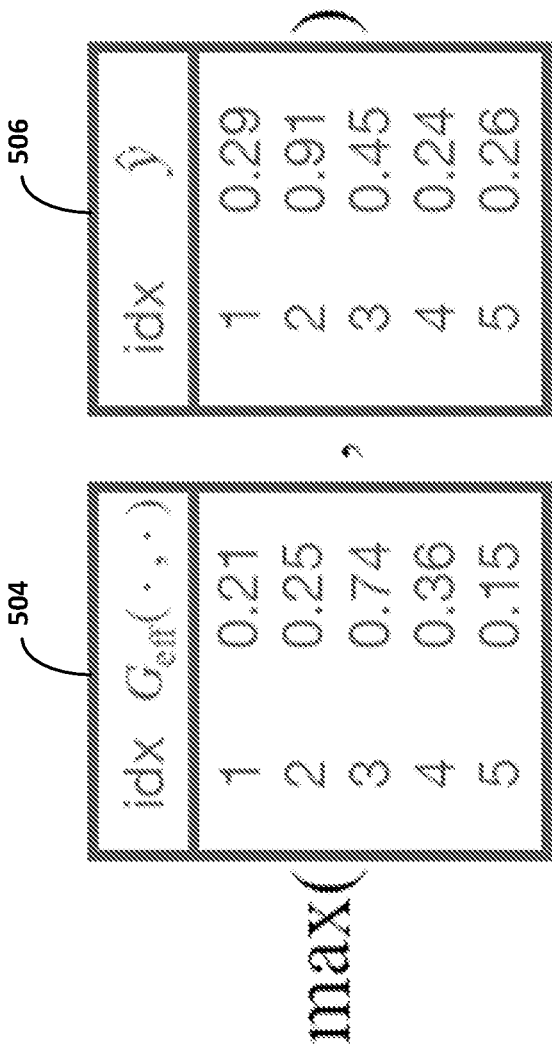
FIG. 6 shows an example framework for determining final hardness scores associated with negative instance in training data in accordance with the present disclosure.

In embodiments, the ensemble sub-system 110 may be configured to generate a subsampling rate based on the importance estimated from the user-item graph and the importance measured by the pre-trained pilot model. For example, the ensemble sub-system 110 may use both the final model-agnostic hardness scores and the final model-based hardness scores to determine a final subsampling rate. As shown in the example framework 600 of FIG. 6, the ensemble sub-system 110 may be configured to determine a maximum between the final model-agnostic hardness scores shown in the table 504 and the final model-based hardness scores shown in the table 506. For example, for each instance, the ensemble sub-system 110 may be configured to determine whether the final model-agnostic hardness score or the final model-based hardness score is greater. For the instance labeled "1," the ensemble sub-system 110 may be configured to determine whether the final model-agnostic hardness score of 0.21 or the final model-based hardness score of 0.29 is greater. As the final model-based hardness score of 0.29 is greater, the final hardness score of 0.29 may be used to calculate the subsampling rate associated with the instance labeled "1." The ensemble sub-system 110 may be configured to make such a determination for each instance. The ensemble sub-system 110 may be configured to generate the subsampling rate based on the final hardness score associated with each instance.

In embodiments, the final subsampling rate may be determined based on the importance estimated from the user-item graph and the importance measured by the pre-trained pilot model. For example, given a sample x, both model-agnostic and model-based subsampling methods may be used to calculate their corresponding sampling rate $\pi_D(x)$ and $\pi\phi(x)$ respectively. Particularly $\pi\phi(x)$ is the subsampling rate for x by using a pre-trained pilot model $h_b(\bullet):=(\hat{f}(\bullet; \phi)$, such as the pre-trained pilot model 402. $\pi_D(x)$ may be the subsampling rate using model agnostic hardness score $h_a(\bullet)$ in Equation 4:

$$\pi\phi(x) \propto \max(\min(p_\phi h_b(x), \vartheta_\phi, 1),$$

$$\pi D(x) \propto \max(\min(p_D h_a(x), \vartheta_D, 1),$$

where $(\vartheta_\phi, \vartheta_D)$ is the minimum sampling rate and $(p_\phi, p_D)$ tunable linear scaling parameters to meet the average subsampling rate $\alpha$.

In embodiments, three simple yet effective heuristic strategies may be used to combine the model-agnostic and model-based subsampling methods to generate a final sampling rate: maximum, mean, and product.

$$\pi_{max}(x) = p_{max}\max(\pi D(x), \pi\phi(x));$$

$$\pi_{mean}(x) = (\pi D(x) + \pi\phi(x))/2;$$

$$\pi_{prod}(x) = \min(\max(p_{prod}\pi D(x)\pi\phi(x)), \vartheta_{prod}), 1), \qquad \text{Equation 8}$$

where $\vartheta_{prod}$ is an extra hyperparameter used when applying product combination, and $p_{max}$ and $p_{prod}$ are tuned to normalize the average sample rate to $\alpha$. After subsampling rate combination, each x may be sampled with probability in Equation 8. Each of the sampled instances may follow the normal training protocol to optimize the training objective as shown in Equation 2, which guarantees the final result to be well-calibrated.

In embodiments, the final sampling rate may be used to subsample the negative instances in the training data 102. The negative instances in the training data 102 may be subsampled based on the final sampling rate. The subsampled negative instances and all of the positive instances in the training data 102 may collectively make up the final subsampled training set 112. FIG. 7 shows an example subsampled training set 112. As shown in the example of FIG. 7, the negative instance labeled "5" in the training data 102 is no longer present in the subsampled training set 112. Thus, the negative instance labeled "5" in the training data 102 was not selected during the subsampling process. The negative instance labeled "4" in the training data 102 and the positive instances labeled "1-3" in the training data 102 are still present in the subsampled training set 112.

In embodiments, an offline recommendation model may be trained using positive instances in the training data 102 and the subsampled negative instances. For example, the offline recommendation model 102 may be trained using the subsampled training set 112. The trained offline recommendation model may be deployed. The deployed offline recommendation model may be configured to recommend items to users.

FIG. 8 illustrates an example process 800 of improving data subsampling for recommendation systems. For example, the system 100 may perform the process 800. Although depicted as a sequence of operations in FIG. 8, those of ordinary skill in the art will appreciate that various embodiments may add, remove, reorder, or modify the depicted operations.

A set of training data may be associated with user-item interactions. The set of training data may comprise a plurality of positive instances and a plurality of negative instances. For example, if a user interacted with (e.g., clicked) a particular item, then a positive instance associated with that item may be collected. Otherwise, if the user did not click a particular item within a period of time, a negative instance associated with that item may be collected. The set of training data may be imbalanced, in that the number of negative instances may greatly outnumber the number of positive instances.

At 802, a user-item graph associated with the training data may be constructed. The user-item bipartite graph may comprise two sets of nodes. One of the two sets of nodes may represent users and the other of the two sets of nodes may represent items. The user-item bipartite graph may comprise edges, with each edge representing interactions between a user node and an item node. The positive edges may indicate that the corresponding user clicked on the corresponding item, while the negative edges may indicate that the corresponding user did not click on the corresponding item (such as within a certain time frame).

As information is sparsely distributed over the large number of negative instances, negative sampling may be used to reduce the dataset size and to boost training efficiency. A negative sampling algorithm may be configured to weigh each negative instance with some measurement of its importance. For example, the measure of importance for a negative instance x may be represented as $\pi(x)$. The importance for a negative instance may be used as the negative sampling rate of the negative instance. At 804, the importance of user-item interactions may be estimated via graph conductance based on the user-item graph. Some hard instances may be overlooked by model-agnostic methods. The hard instances that may be overlooked by model-agnostic methods may be captured by model-based methods, such as by a pre-trained pilot model. At 806, the importance of the training data may be measured via sample hardness using a pre-trained pilot model. The pre-trained pilot model may generate a pilot prediction as a hardness score for each user-item pair in the training data.

In embodiments, the final subsampling rate may be determined based on the importance estimated from the user-item graph and the importance measured by the pre-trained pilot model. At 808, a subsampling rate may be generated based on the importance estimated from the user-item graph and the importance measured by the pre-trained pilot model. For example, given a sample x, both model-agnostic and model-based subsampling methods may be used to calculate their corresponding sampling rate $\pi_D(x)$ and $\pi\phi(x)$ respectively. In embodiments, three simple yet effective heuristic strategies may be used to combine the model-agnostic and model-based subsampling methods to generate a final sampling rate: maximum, mean, and product. After subsampling rate combination, each x may be sampled with probability in Equation 8. Each of the sampled instances may follow the normal training protocol to optimize the training objective as shown in Equation 2, which guarantees the final result to be well-calibrated.

FIG. 9 illustrates an example process 900 of improving data subsampling for recommendation systems. For example, the system 100 may perform the process 900. Although depicted as a sequence of operations in FIG. 9, those of ordinary skill in the art will appreciate that various embodiments may add, remove, reorder, or modify the depicted operations.

In embodiments, the final subsampling rate may be determined based on an importance estimated from the user-item graph and an importance measured by the pre-trained pilot model. At 902, a subsampling rate may be generated based on the importance estimated from the user-item graph and the importance measured by the pre-trained pilot model. For example, given a sample x, both model-agnostic and model-based subsampling methods may be used to calculate their corresponding sampling rate $\pi D(x)$ and $\pi\phi(x)$ respectively. In embodiments, three simple yet effective heuristic strategies may be used to combine the model-agnostic and model-based subsampling methods to generate a final sampling rate: maximum, mean, and product. After subsampling rate combination, each x may be sampled with probability in Equation 8. Each of the sampled instances may follow the normal training protocol to optimize the training objective as shown in Equation 2, which guarantees the final result to be well-calibrated.

The final sampling rate may be used to subsample the negative instances in training data. At 904, negative instances in training data may be subsampled based on the final subsampling rate. The subsampled negative instances and all of the positive instances in the training data may collectively make up the final subsampled training set. An offline recommendation model may be trained using positive instances in the training data and the subsampled negative instances. At 906, an an offline recommendation model may be trained using positive instances in the training data and the subsampled negative instances. For example, the offline recommendation model may be trained using the subsampled training set. The trained offline recommendation model may be deployed. The deployed offline recommendation model may be configured to recommend items to users.

FIG. 10 illustrates an example process 1000 of improving data subsampling for recommendation systems. For example, the system 100 may perform the process 1000. Although depicted as a sequence of operations in FIG. 10, those of ordinary skill in the art will appreciate that various embodiments may add, remove, reorder, or modify the depicted operations.

A set of training data may be associated with user-item interactions. The set of training data may comprise a plurality of positive instances and a plurality of negative instances. For example, if a user interacted with (e.g., clicked) a particular item, then a positive instance associated with that item may be collected. Otherwise, if the user did not click a particular item within a period of time, a negative instance associated with that item may be collected. The set of training data may be imbalanced, in that the number of negative instances may greatly outnumber the number of positive instances.

At 1002, a user-item graph associated with the training data may be constructed. The user-item bipartite graph may comprise two sets of nodes. One of the two sets of nodes may represent users and the other of the two sets of nodes may represent items. The user-item bipartite graph may comprise edges, with each edge representing interactions between a user node and an item node. The positive edges may correspond to positives instances in the training data, and the negative edges may correspond to negative instances in the training data.

At 1004, a hardness score associated with each of the negative instances may be estimated by calculating an effective conductance corresponding to each negative edge. For example, the user-item bipartite graph may be imagined as an electricity network, where each edge $(u_{i_n}, v_{j_n})$ is a conductor with conductance $G(u_{i_n}, v_{j_n})$. The conductance measures the edge's ability to transfer "electrical current." $G(u_{i_n}, v_{j_n})$ may be large when a user $u_{i_n}$ expresses direct preference of item $v_{j_n}$. In particular, $G(u_{i_n}, v_{j_n})$ may be set to equal $y_n$. Thus, the conductance may be equal to one if there is a direct preference, and the conductance may be equal to zero if there is not a direct preference expressed. The effective conductance $G_{eff}(u_{i_n}, v_{j_n})$ between $u_{i_n}$ and $v_{j_n}$ may represent the network's ability to transfer "current" from $u_{i_n}$ to $v_{j_n}$ (or vice versa). If there are many conductible paths between $u_{i_n}$ and $v_{j_n}$, then the effective conductance $G_{eff}(u_{i_n}, v_{j_n})$ may be large. Effective conductance may demonstrate user preference. Sample hardness may be estimated via effective conductance. Effective conductance positively relates to sample hardness.

At 1006, the hardness score associated with each of the negative instances may be smoothed using graph propagation. The edge effective conductance derived from the graph may be noisy, thus leading to an inaccurate estimation of hardness scores. Graph propagation may be used to smooth the hardness score. Edge propagation may be reduced to node propagation by transforming the user-item bipartite graph (U, V, E) into its corresponding line graph L(U, V, E)=$(V_L, E_L)$, where $V_L=E$ and $E_L$ is the collection of edge pairs that share the same node.

Figure 11:
FIG. 11 shows an example process for improving data subsampling of recommendation systems in accordance with the present disclosure.

FIG. 11 illustrates an example process 1100 of improving data subsampling for recommendation systems. For example, the system 100 may perform the process 1100. Although depicted as a sequence of operations in FIG. 11, those of ordinary skill in the art will appreciate that various embodiments may add, remove, reorder, or modify the depicted operations.

The edge effective conductance derived from a graph may be noisy, thus leading to an inaccurate estimation of hardness scores. Graph propagation may be used to smooth the hardness score. Edge propagation may be reduced to node propagation by transforming the user-item bipartite graph (U, V, E) into its corresponding line graph $L(U, V, E)=(V_L, E_L)$, where $V_L=E$ and $E_L$ is the collection of edge pairs that share the same node.

The hardness score associated with each of the negative instances may be smoothed using graph propagation. Smoothing the hardness score associated with each of the negative instances may comprise determining an average effective conductance associated with neighboring negative edges of each negative edge. At 1102, an average effective conductance associated with neighboring negative edges of each negative edge may be determined. Then, for each negative edge, a weighted sum of the average effective conductance and a corresponding effective conductance may be calculated. At 1104, a weighted sum of the average effective conductance and a corresponding effective conductance may be calculated for each negative edge. The weighted sum may be equal to the final model-agnostic hardness score for that negative edge.

FIG. 12 illustrates an example process 1200 of improving data subsampling for recommendation systems. For example, the system 100 may perform the process 1200. Although depicted as a sequence of operations in FIG. 12, those of ordinary skill in the art will appreciate that various embodiments may add, remove, reorder, or modify the depicted operations.

Some hard instances may be overlooked by model-agnostic methods. For example, estimating sample hardness via effective conductance in the manner described above (e.g., a model-agnostic method) may cause some hard instances to be overlooked. The hard instances that may be overlooked by model-agnostic methods may be captured by model-based methods, such as by a pre-trained pilot model. At 1202, a hardness score associated with each negative instance in training data may be generated. The hardness score associated with each negative instance in training data may be generated using a pre-trained pilot model. At 1204, the hardness score associated with each of the negative instances may be smoothed. For example, the hardness score associated with each of the negative instances may be smoothed based on a line graph transformation of the user-item bipartite graph and graph propagation.

FIG. 13 illustrates an example process 1300 of improving data subsampling for recommendation systems. For example, the system 100 may perform the process 1300. Although depicted as a sequence of operations in FIG. 13, those of ordinary skill in the art will appreciate that various embodiments may add, remove, reorder, or modify the depicted operations.

A line-graph transformation of the user-item bipartite graph may be used to smooth model-agnostic hardness scores and model-based hardness scores. To smooth the hardness scores associated with both model-agnostic and model-based methods, graph propagation techniques may be utilized. The edge effective conductance derived from the graph may be noisy, thus leading to an inaccurate estimation of hardness scores. Graph propagation may be used to smooth the hardness score.

At 1302, a final hardness score associated with each negative instances in the training data may be determined. The final hardness score may be determined based on a corresponding smoothed hardness score determined based on a user-item graph and a corresponding smoothed hardness score determined by a pre-trained pilot model. For example, a maximum between the final model-agnostic hardness scores and the final model-based hardness scores may be determined. For example, for each instance, it may be determined whether the final model-agnostic hardness score or the final model-based hardness score is greater.

A subsampling rate may be generated based on the final hardness score associated with each instance. At 1304, a subsampling rate of the negative instances in the training data may be generated based on the final hardness score associated with each of the negative instances. Negative instances in the training data may be subsampled based on the subsampling rate. An offline recommendation model may be trained using positive instances in the training data and the subsampled negative instances.

As described above, for model-based sampling, pilot misspecification may lead to discrepancies in model performance. Described below are the results of experiments showing that pilot misspecification may lead to discrepancies in model performance. Also described below are the empirical results over two datasets that demonstrate the superiority of the model agnostic subsampling method described herein. The results of extensive ablation studies that were conducted to investigate the effectiveness of model-agnostic hardness score, score propagation, and the benefit of ensembling model-agnostic and model-based methods are also described below. Finally, effective resistance and its relationship to negative sampling is discussed below.

The empirical results described below are demonstrated using a first data set (e.g., KuaiRec) and a second data set (e.g., Microsoft News Dataset (MIND)). For both datasets, 80% of the data was used for training, 10% was used for validation, and 10% was used for testing. All experimental results are reported for 8 runs with random initializations on one random data split. The average subsampling rate was $\alpha=0.2$ on training data for both datasets.

The first data set is a recommendation dataset collected from a video-sharing mobile app. The first dataset is generally a sparse user-item interaction matrix with a fully observed small submatrix. The fully observed submatrix was cropped and only the rest of entries in the sparse matrix were considered as those data are collected under natural settings. The label "watch ratio" was used, which represents the total duration of a user watching a video divided by the video duration. In the experiment, a user is considered to like a video (positive instance) if the "watch ratio" is larger than 3. The second data set is a large-scale news recommendation dataset with binary labels indicating users' impressions of recommended news. The content data in each news corpus was not used during the experiment. The second data set did not require extra pre-processing.

Regarding the baselines and model selections for the experiments, two baseline subsampling methods were considered. The first baseline subsampling method is the model-agnostic uniform negative sampling and the second is a model-based near-optimal sampling method (Opt-Sampling), which relies on the prediction scores of a pilot model as the hardness score to calculate sample rates. Regarding the model architecture, the wide and deep model was chosen as the training target model to validate the effectiveness of the model-agnostic method described herein.

For model-based subsampling methods, a pilot model was pre-trained to estimate the sample hardness. To test the effect of pilot misspecification, five types of pilot models were considered. Those pilot models are: the wide and deep model (W&D), a linear logistic regression model (LR), an automatic feature interaction selection model (AFI), a neural factorization machines model (NFM), and a deep factorization machine model (DFM). In the remainder of the experiment description, unless otherwise specified, the W&D is used as the pilot model as it shares the same architecture as the target model (consistent pilot). All pilot models were trained using 10% of the training data.

Figure 14:
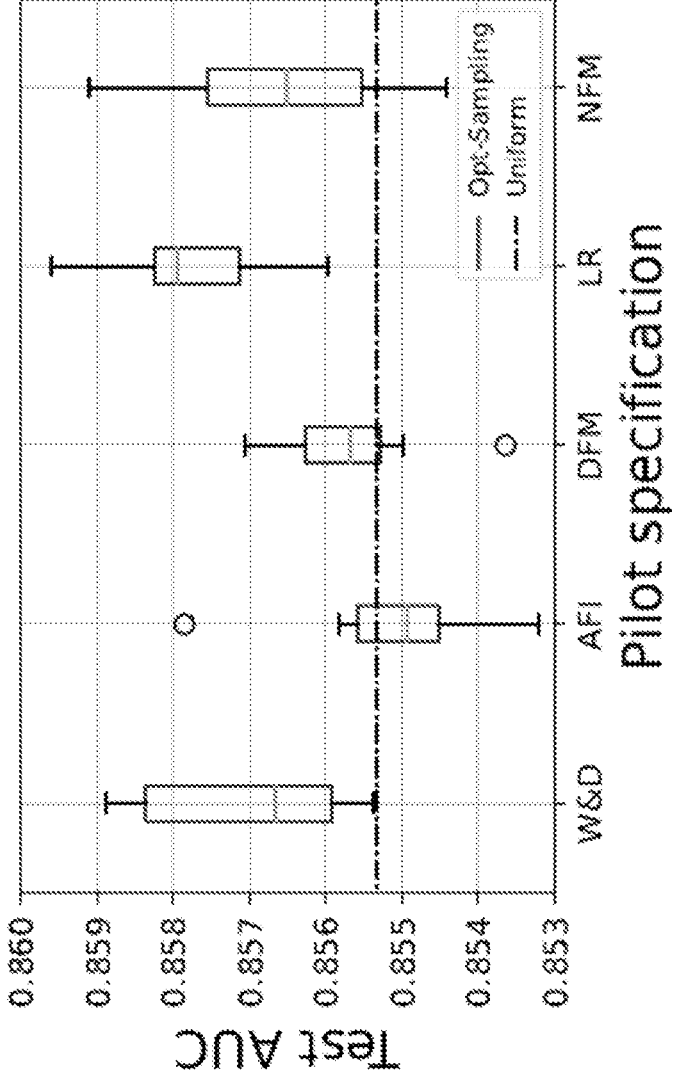
FIG. 14 shows a box plot illustrating experimental results associated with a recommender system in accordance with the present disclosure.

As described above, model-based subsampling may rely on a correctly specified pilot model. This concept was studied on the first dataset when the pilot model is misspecified by using the same model-based subsampling approach while changing pilot model architectures. FIG. 14 shows a box plot 1400 reporting the target model performance. As shown in the graph 1400, the target model's area under the curve (AUC) obtained from different pilot models varies from 0.8557 (AFI) to 0.8577 (LR). As the standard deviation is around 0.001, the AUC difference is significant, demonstrating a potential loss in large-scale recommendation systems processing millions of data points on a daily basis. This result consolidates the effect of pilot misspecification, which justifies using model-agnostic subsampling approaches, such as the techniques described herein.

Figure 15:
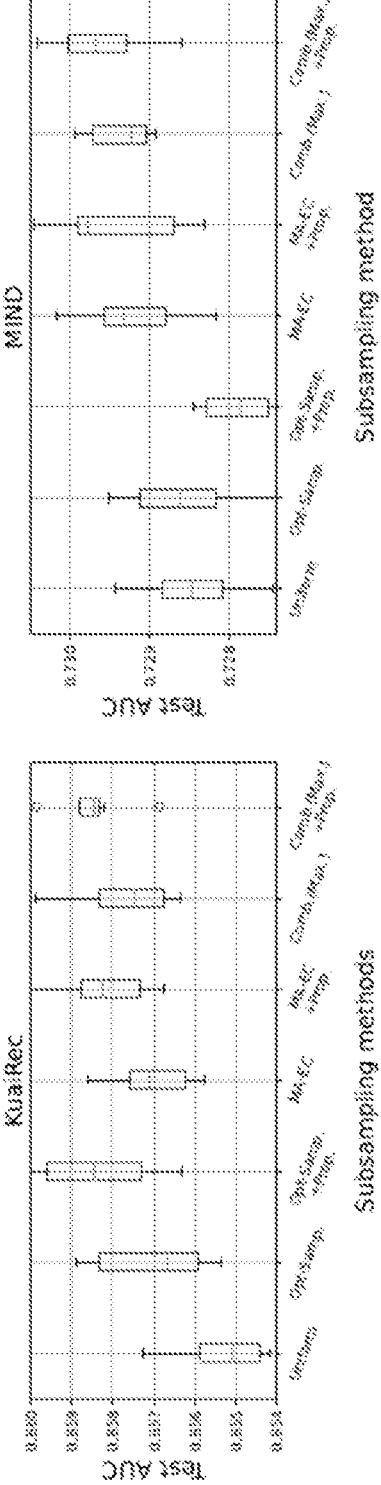
FIG. 15 shows a set of box plots illustrating experimental results associated with a recommender system in accordance with the present disclosure.

The target model was trained with different data sampling strategies. FIG. 15 shows a set of box plots 1500 showing the AUC performance of all training configurations on the two datasets. The graph on the left shows the AUC performance of all training configurations on the first data set, while the graph on the right shows the AUC performance of all training configurations on the second data set. As shown in FIG. 15, the model-agnostic effective conductance (MA-EC) sampling strategy consistently outperforms the uniform sampling baseline over both of the two datasets. In the first data set, MA-EC achieves comparable results to Opt-Sampling. In the second data set, Opt-Sampling does not improve over uniform sampling and is worse than MA-EC. As also shown in FIG. 15, extra performance is gained by smoothing the hardness estimation via propagation. The performance of ensembling the model-agnostic method and the model-based method via the maximum strategy is also shown in FIG. 15 (referred to as "Comb(Max.)) in the set of box plots 1500). FIG. 15 shows that the ensemble performs better than every single approach on both datasets. Similarly, the smoothed scores from Opt-Sampling and MA-EC may be ensembled, achieving the best performance demonstrated in the last column of the set of box plots 1500.

Figure 16:
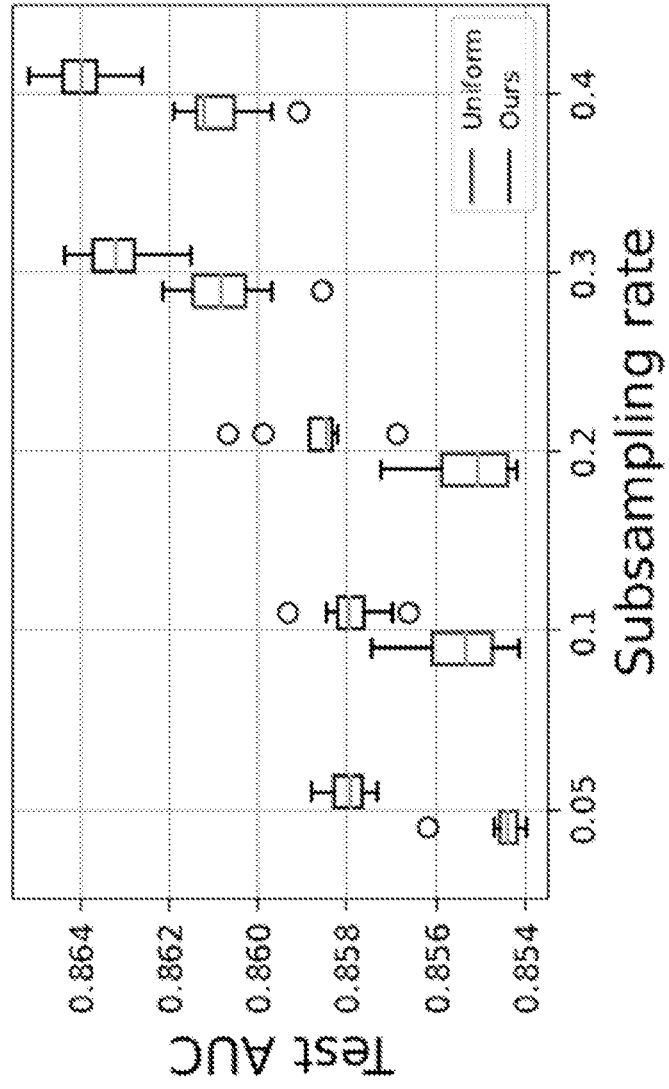
FIG. 16 shows a box plot illustrating experimental results associated with a recommender system in accordance with the present disclosure.

The first data set was used to conduct extensive ablation studies. Regarding the subsampling rate, uniform sampling was compared with the best of the methods described herein by ensembling smoothed scores from Opt-Sampling and MA-EC. FIG. 16 shows a box plot 1600. The box plot 1600 demonstrates that the methods described herein consistently outperform uniform sampling under different subsampling rates. For example, the box plot 1600 shows that the AUC for the methods described herein is consistently higher than the AUC for uniform sampling under different subsampling rates.

Regarding the ensemble strategies, to investigate whether hardness scores from MA-EC and Opt-Sampling complement each other, a control experiment was designed.

Instances were assigned with subsampling rates from each method. For instances that have inconsistent subsampling rates between two methods, their subsampling rates were flipped into the other method. For example, instances that have $\pi D(x)<0.2$ and $\pi\phi(x)>0.8$ were assigned with the subsampling rate $\pi\phi(x)$, and the rest of the instances were assigned with the subsampling rate $\pi D(x)$. The result of the experiment shows that we achieve better model performance by assigning most of the sample with one set of scores and flipping part of the sample scores. This verifies that some hard negative instances might be overlooked by one method and can be discovered by the other.

Figures 17A, 17B:
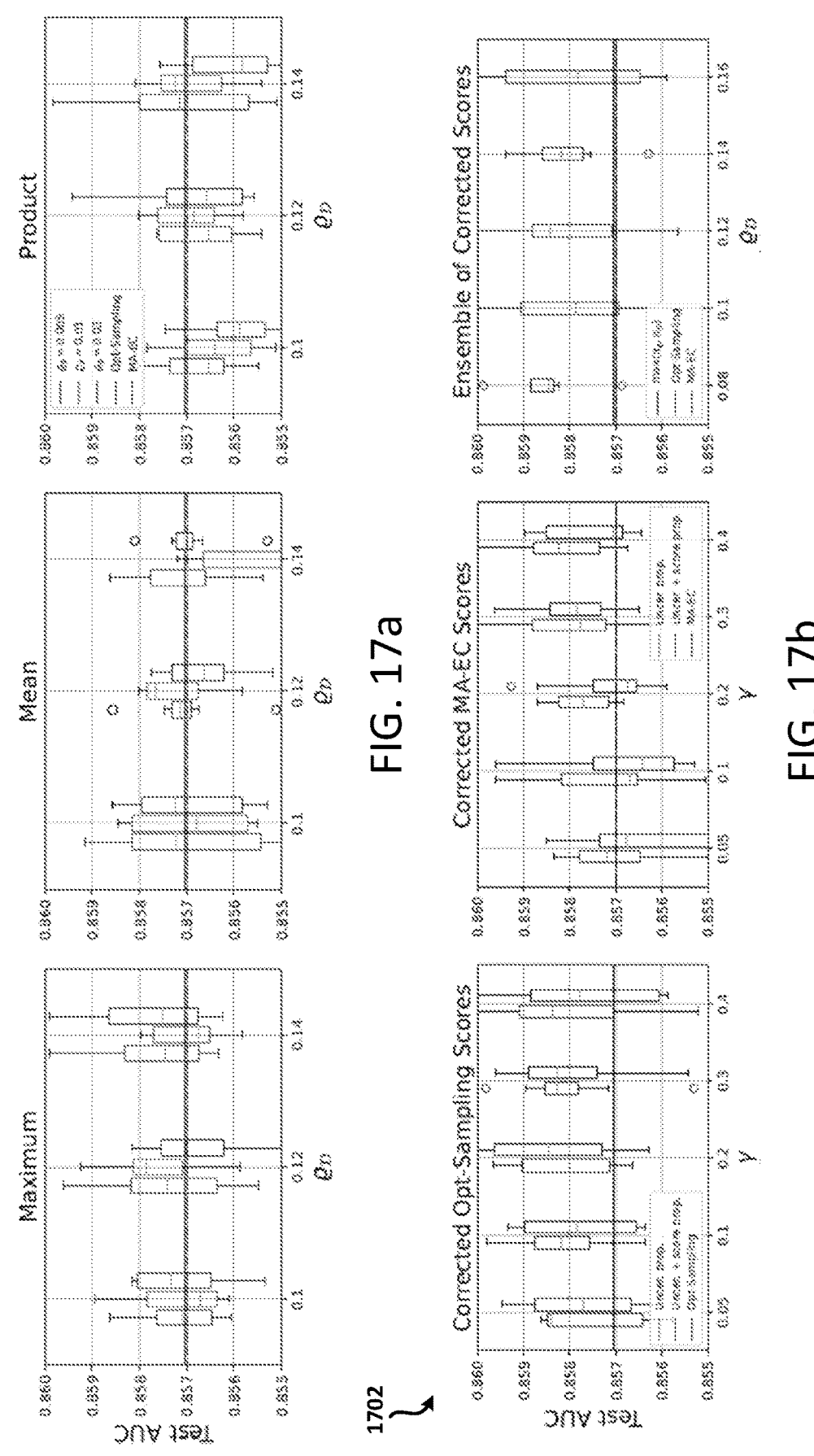
FIG. 17a shows a set of box plots illustrating experimental results associated with a recommender system in accordance with the present disclosure
FIG. 17b shows a set of box plots illustrating experimental results associated with a recommender system in accordance with the present disclosure.

The control experiment justifies ensembling MA-EC and Opt-Sampling. The ensemble strategies (maximum, mean, and product) were experimented on. FIG. 17a shows a set of box plots 1700 of the three ensemble methods. For each method, nine configurations of the hyperparameters ($\varrho$ D, $\varrho$ $\phi$) are presented, where $\varrho$ D$\in\{0.1, 0.12, 0.14\}$ and $\varrho$ $\phi\in\{0.005, 0.01, 0.03\}$. For product strategy, hyperparameter $\varrho$ prod=0.005 for all experiments. From the box plots 1700, it can be observed that the maximum strategy consistently gives comparable or better results than Opt-Sampling and MA-EC. While in mean and product strategies significant improvement is not observed. For the product strategy, the model performance even deteriorates. MA-EC needs to compute effective conductance to calculate subsampling rates. Effective conductance computation is not a bottleneck since it can be reused once computed. MA-EC is model-agnostic, thus can support training with different target models.

The effectiveness of correcting the hardness scores via graph propagation was investigated. The application of score correction in Opt-Sampling and MA-EC and their ensemble was of interest. Additionally, in applying both score correction and score ensemble, either ensembling corrected scores or correcting ensemble scores may be attempted. The latter consistently results in worse performance, so presented herein is only the result of the former in this work. FIG. 17b shows a set of box plots 1702 reporting the model performance of the ablation study. For the experiments of correcting scores estimated from Opt-Sampling and MA-EC, the propagation coefficient $\gamma\in\{0.05, 0.1, 0.2, 0.3, 0.4\}$ was explored. For each coefficient, iteration to smooth the scores until convergence was performed. Uncertainty propagation significantly improves model performance for both subsampling approaches. In score propagation, which runs on scores corrected by uncertainty propagation, model performance slightly improves in Opt-Sampling and worsens in MA-EC. In the ensemble of corrected scores, the hardness scores from the best configurations of both methods were combined via the maximum strategy described above. The reported result in the box plots 1702 demonstrates that the ensemble strategy improves model performance over not only the original scores but also the corrected scores.

The definition provided for effective resistance $R_{eff}$ in Equation 3 is often used for graph sparsification. An edge with high effective resistance is considered important in maintaining graph topology. Since the definitions of edge importance using effective conductance and effective resistance run against each other, it can be shown that defining edge importance with effective resistance is not applicable to the scenario described herein. For example, two model-agnostic subsampling methods with effective resistance (MA-ER) and effective conductance (MA-EC) as the hardness scores were compared. The effective resistance was computed on the graph where all edges have unit resistances.

Figure 18:
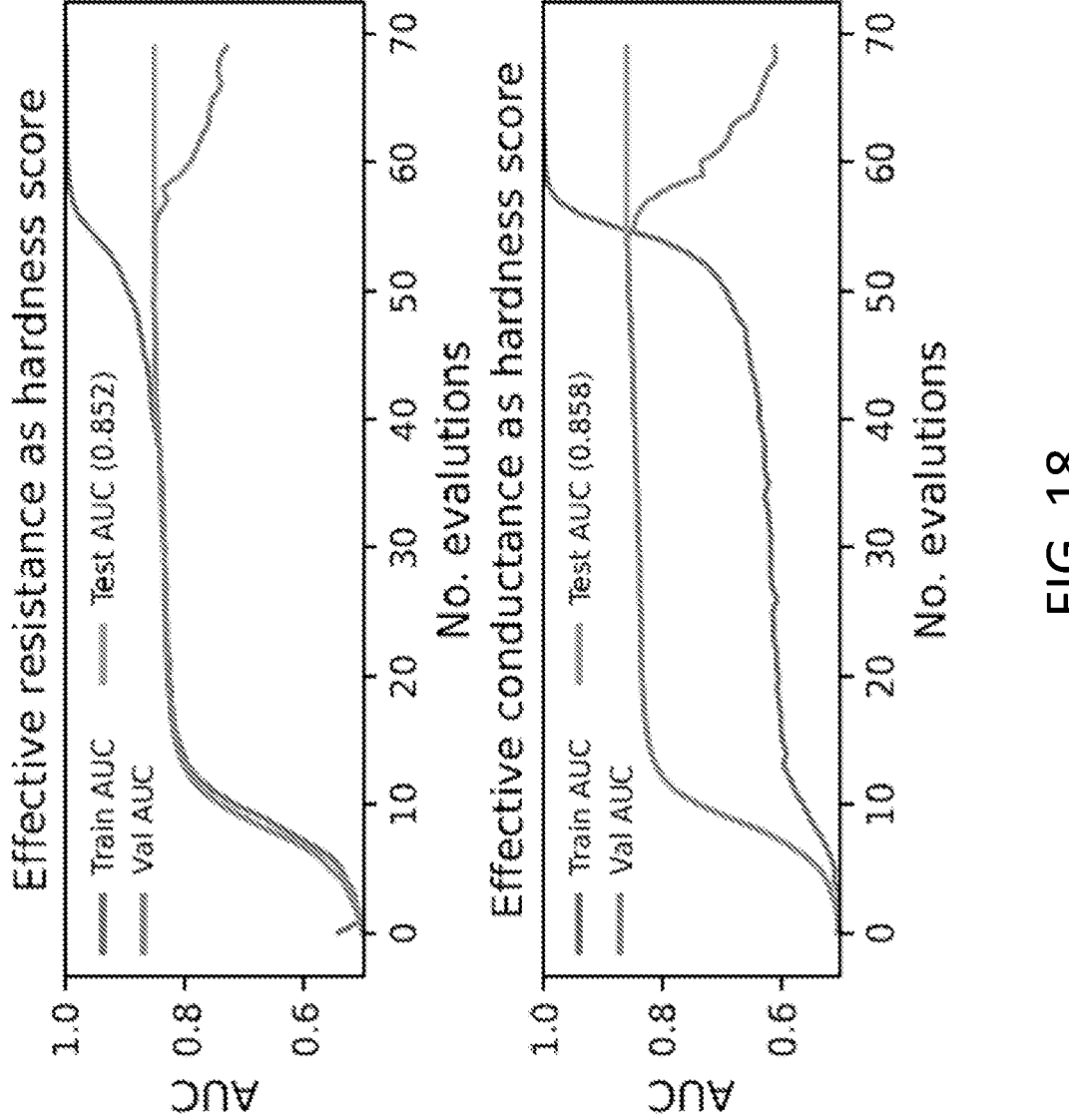
FIG. 18 shows a set of graphs illustrating experimental results associated with a recommender system in accordance with the present disclosure.

MA-ER fails to capture hard negative instances. On the first data set, MA-ER yields an average test AUC of 0.8535, which is worse than uniform sampling (0.8553). To unravel how MA-ER and MA-EC affect model training, a run from each method was randomly selected to visualize the model training metrics. As shown in the set of graphs 1800 of FIG. 18, when using MA-ER, training AUC remains the same as testing AUC before convergence. Besides, the model converges earlier. In sharp contrast, in MA-EC, there is a huge gap between training AUC and testing AUC. The gap shows that training instances are overall harder than those in the test set. This verifies that MA-EC discovers hard negatives while MA-ER does not.

Figure 19:
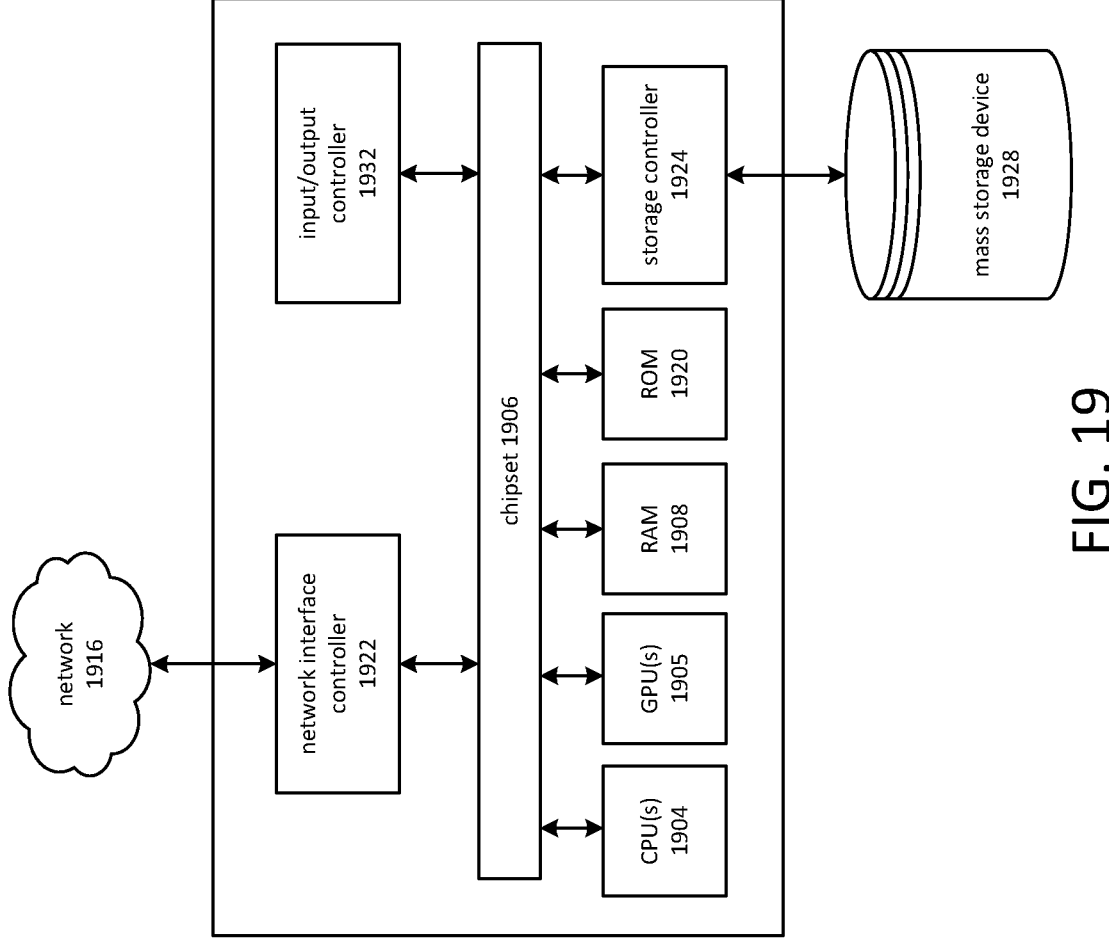
FIG. 19 shows an example computing device which may be used to perform any of the techniques disclosed herein.

FIG. 19 illustrates a computing device that may be used in various aspects, such as the services, networks, modules, and/or devices depicted in FIG. 1. With regard to the example architecture of FIG. 1, the cloud network (and any of its components), the client devices, and/or the network may each be implemented by one or more instance of a computing device 1900 of FIG. 19. The computer architecture shown in FIG. 19 shows a conventional server computer, workstation, desktop computer, laptop, tablet, network appliance, PDA, e-reader, digital cellular phone, or other computing node, and may be utilized to execute any aspects of the computers described herein, such as to implement the methods described herein.

The computing device 1900 may include a baseboard, or "motherboard," which is a printed circuit board to which a multitude of components or devices may be connected by way of a system bus or other electrical communication paths. One or more central processing units (CPUs) 1904 may operate in conjunction with a chipset 1906. The CPU(s) 1904 may be standard programmable processors that perform arithmetic and logical operations necessary for the operation of the computing device 1900.

The CPU(s) 1904 may perform the necessary operations by transitioning from one discrete physical state to the next through the manipulation of switching elements that differentiate between and change these states. Switching elements may generally include electronic circuits that maintain one of two binary states, such as flip-flops, and electronic circuits that provide an output state based on the logical combination of the states of one or more other switching elements, such as logic gates. These basic switching elements may be combined to create more complex logic circuits including registers, adders-subtractors, arithmetic logic units, floating-point units, and the like.

The CPU(s) 1904 may be augmented with or replaced by other processing units, such as GPU(s) 1905. The GPU(s) 1905 may comprise processing units specialized for but not necessarily limited to highly parallel computations, such as graphics and other visualization-related processing.

A chipset 1906 may provide an interface between the CPU(s) 1904 and the remainder of the components and devices on the baseboard. The chipset 1906 may provide an interface to a random-access memory (RAM) 1908 used as the main memory in the computing device 1900. The chipset 1906 may further provide an interface to a computer-readable storage medium, such as a read-only memory (ROM) 1920 or non-volatile RAM (NVRAM) (not shown), for storing basic routines that may help to start up the computing device 1900 and to transfer information between the various components and devices. ROM 1920 or NVRAM may also store other software components necessary for the operation of the computing device 1900 in accordance with the aspects described herein.

The computing device 1900 may operate in a networked environment using logical connections to remote computing nodes and computer systems through local area network (LAN). The chipset 1906 may include functionality for providing network connectivity through a network interface controller (NIC) 1922, such as a gigabit Ethernet adapter. A NIC 1922 may be capable of connecting the computing device 1900 to other computing nodes over a network 1916. It should be appreciated that multiple NICs 1922 may be present in the computing device 1900, connecting the computing device to other types of networks and remote computer systems.

The computing device 1900 may be connected to a mass storage device 1928 that provides non-volatile storage for the computer. The mass storage device 1928 may store system programs, application programs, other program modules, and data, which have been described in greater detail herein. The mass storage device 1928 may be connected to the computing device 1900 through a storage controller 1924 connected to the chipset 1906. The mass storage device 1928 may consist of one or more physical storage units. The mass storage device 1928 may comprise a management component. A storage controller 1924 may interface with the physical storage units through a serial attached SCSI (SAS) interface, a serial advanced technology attachment (SATA) interface, a fiber channel (FC) interface, or other type of interface for physically connecting and transferring data between computers and physical storage units.

The computing device 1900 may store data on the mass storage device 1928 by transforming the physical state of the physical storage units to reflect the information being stored. The specific transformation of a physical state may depend on various factors and on different implementations of this description. Examples of such factors may include, but are not limited to, the technology used to implement the physical storage units and whether the mass storage device 1928 is characterized as primary or secondary storage and the like.

For example, the computing device 1900 may store information to the mass storage device 1928 by issuing instructions through a storage controller 1924 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computing device 1900 may further read information from the mass storage device 1928 by detecting the physical states or characteristics of one or more particular locations within the physical storage units.

In addition to the mass storage device 1928 described above, the computing device 1900 may have access to other computer-readable storage media to store and retrieve information, such as program modules, data structures, or other data. It should be appreciated by those skilled in the art that computer-readable storage media may be any available media that provides for the storage of non-transitory data and that may be accessed by the computing device 1900.

By way of example and not limitation, computer-readable storage media may include volatile and non-volatile, transitory computer-readable storage media and non-transitory computer-readable storage media, and removable and non-removable media implemented in any method or technology. Computer-readable storage media includes, but is not limited to, RAM, ROM, erasable programmable ROM ("EPROM"), electrically erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage, other magnetic storage devices, or any other medium that may be used to store the desired information in a non-transitory fashion.

A mass storage device, such as the mass storage device 1928 depicted in FIG. 19, may store an operating system utilized to control the operation of the computing device 1900. The operating system may comprise a version of the LINUX operating system. The operating system may comprise a version of the WINDOWS SERVER operating system from the MICROSOFT Corporation. According to further aspects, the operating system may comprise a version of the UNIX operating system. Various mobile phone operating systems, such as IOS and ANDROID, may also be utilized. It should be appreciated that other operating systems may also be utilized. The mass storage device 1928 may store other system or application programs and data utilized by the computing device 1900.

The mass storage device 1928 or other computer-readable storage media may also be encoded with computer-executable instructions, which, when loaded into the computing device 1900, transforms the computing device from a general-purpose computing system into a special-purpose computer capable of implementing the aspects described herein. These computer-executable instructions transform the computing device 1900 by specifying how the CPU(s) 1904 transition between states, as described above. The computing device 1900 may have access to computer-readable storage media storing computer-executable instructions, which, when executed by the computing device 1900, may perform the methods described herein.

A computing device, such as the computing device 1900 depicted in FIG. 19, may also include an input/output controller 1932 for receiving and processing input from a number of input devices, such as a keyboard, a mouse, a touchpad, a touch screen, an electronic stylus, or other type of input device. Similarly, an input/output controller 1932 may provide output to a display, such as a computer monitor, a flat-panel display, a digital projector, a printer, a plotter, or other type of output device. It will be appreciated that the computing device 1900 may not include all of the components shown in FIG. 19, may include other components that are not explicitly shown in FIG. 19, or may utilize an architecture completely different than that shown in FIG. 19.

As described herein, a computing device may be a physical computing device, such as the computing device 1900 of FIG. 19. A computing node may also include a virtual machine host process and one or more virtual machine instances. Computer-executable instructions may be executed by the physical hardware of a computing device indirectly through interpretation and/or execution of instructions stored and executed in the context of a virtual machine.

It is to be understood that the methods and systems are not limited to specific methods, specific components, or to particular implementations. It is also to be understood that the terminology used herein is for the purpose of describing particular embodiments only and is not intended to be limiting.

As used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other components, integers or steps. "Exemplary" means "an example of" and is not intended to convey an indication of a preferred or ideal embodiment. "Such as" is not used in a restrictive sense, but for explanatory purposes.

Components are described that may be used to perform the described methods and systems. When combinations, subsets, interactions, groups, etc., of these components are described, it is understood that while specific references to each of the various individual and collective combinations and permutations of these may not be explicitly described, each is specifically contemplated and described herein, for all methods and systems. This applies to all aspects of this application including, but not limited to, operations in described methods. Thus, if there are a variety of additional operations that may be performed it is understood that each of these additional operations may be performed with any specific embodiment or combination of embodiments of the described methods.

The present methods and systems may be understood more readily by reference to the following detailed description of preferred embodiments and the examples included therein and to the Figures and their descriptions.

As will be appreciated by one skilled in the art, the methods and systems may take the form of an entirely hardware embodiment, an entirely software embodiment, or an embodiment combining software and hardware aspects. Furthermore, the methods and systems may take the form of a computer program product on a computer-readable storage medium having computer-readable program instructions (e.g., computer software) embodied in the storage medium. More particularly, the present methods and systems may take the form of web-implemented computer software. Any suitable computer-readable storage medium may be utilized including hard disks, CD-ROMs, optical storage devices, or magnetic storage devices.

Embodiments of the methods and systems are described below with reference to block diagrams and flowchart illustrations of methods, systems, apparatuses and computer program products. It will be understood that each block of the block diagrams and flowchart illustrations, and combinations of blocks in the block diagrams and flowchart illustrations, respectively, may be implemented by computer program instructions. These computer program instructions may be loaded on a general-purpose computer, special-purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that may direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

The various features and processes described above may be used independently of one another, or may be combined in various ways. All possible combinations and sub-combinations are intended to fall within the scope of this disclosure. In addition, certain methods or process blocks may be omitted in some implementations. The methods and processes described herein are also not limited to any particular sequence, and the blocks or states relating thereto may be performed in other sequences that are appropriate. For example, described blocks or states may be performed in an order other than that specifically described, or multiple blocks or states may be combined in a single block or state. The example blocks or states may be performed in serial, in parallel, or in some other manner. Blocks or states may be added to or removed from the described example embodiments. The example systems and components described herein may be configured differently than described. For example, elements may be added to, removed from, or rearranged compared to the described example embodiments.

It will also be appreciated that various items are illustrated as being stored in memory or on storage while being used, and that these items or portions thereof may be transferred between memory and other storage devices for purposes of memory management and data integrity. Alternatively, in other embodiments, some or all of the software modules and/or systems may execute in memory on another device and communicate with the illustrated computing systems via inter-computer communication. Furthermore, in some embodiments, some or all of the systems and/or modules may be implemented or provided in other ways, such as at least partially in firmware and/or hardware, including, but not limited to, one or more application-specific integrated circuits ("ASICs"), standard integrated circuits, controllers (e.g., by executing appropriate instructions, and including microcontrollers and/or embedded controllers), field-programmable gate arrays ("FPGAs"), complex programmable logic devices ("CPLDs"), etc. Some or all of the modules, systems, and data structures may also be stored (e.g., as software instructions or structured data) on a computer-readable medium, such as a hard disk, a memory, a network, or a portable media article to be read by an appropriate device or via an appropriate connection. The systems, modules, and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other embodiments. Accordingly, the present invention may be practiced with other computer system configurations.

While the methods and systems have been described in connection with preferred embodiments and specific examples, it is not intended that the scope be limited to the particular embodiments set forth, as the embodiments herein are intended in all respects to be illustrative rather than restrictive.

Unless otherwise expressly stated, it is in no way intended that any method set forth herein be construed as requiring that its operations be performed in a specific order. Accordingly, where a method claim does not actually recite an order to be followed by its operations or it is not otherwise specifically stated in the claims or descriptions that the operations are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; and the number or type of embodiments described in the specification.

It will be apparent to those skilled in the art that various modifications and variations may be made without departing from the scope or spirit of the present disclosure. Other embodiments will be apparent to those skilled in the art from consideration of the specification and practices described herein. It is intended that the specification and example figures be considered as exemplary only, with a true scope and spirit being indicated by the following claims.

What is claimed is:

1. A method of improving data subsampling for recommendation systems, comprising:

constructing a user-item graph associated with training data, wherein the constructing a user-item graph associated with training data comprises constructing a bipartite graph from the training data, the bipartite graph comprises positive edges and negative edges, the positive edges corresponding to positives instances in the training data, and the negative edges corresponding to negative instances in the training data;

estimating importance of user-item interactions via graph conductance based on the user-item graph, wherein the estimating importance of user-item interactions via graph conductance based on the user-item graph comprises:

estimating a hardness score associated with each of the negative instances by calculating an effective conductance corresponding to each negative edge, and smoothing the hardness score associated with each of the negative instances using graph propagation;

measuring importance of the training data via sample hardness using a pre-trained pilot model; and generating a subsampling rate based on the importance estimated from the user-item graph and the importance measured by the pre-trained pilot model.

2. The method of claim 1, further comprising:

subsampling negative instances in the training data based on the subsampling rate.

3. The method of claim 2, further comprising:

training an offline recommendation model using positive instances in the training data and the subsampled negative instances.

4. The method of claim 1, wherein the smoothing the hardness score associated with each of the negative instances using graph propagation further comprises:

determining an average effective conductance associated with neighboring negative edges of each negative edge; and calculating, for each negative edge, a weighted sum of the average effective conductance and a corresponding effective conductance.

5. The method of claim 1, wherein the measuring importance of the training data via sample hardness using a pre-trained pilot model further comprises:

generating a hardness score associated with each negative instance in the training data using the pre-trained pilot model; and smoothing the hardness score associated with each of the negative instances.

6. The method of claim 1, wherein the generating a subsampling rate based on the importance estimated from the user-item graph and the importance measured by the pre-trained pilot model further comprises:

determining a final hardness score associated with each negative instance in the training data based on a corresponding smoothed hardness score determined based on the user-item graph and a corresponding smoothed hardness score determined by the pre-trained pilot model; and generating the subsampling rate of negative instances in the training data based on the final hardness score associated with each of the negative instances.

7. A system, comprising:

at least one processor; and at least one memory comprising computer-readable instructions that upon execution by the at least one processor cause the system to perform operations comprising:

constructing a user-item graph associated with training data, wherein the constructing a user-item graph associated with training data comprises constructing a bipartite graph from the training data, the bipartite graph comprises positive edges and negative edges, the positive edges corresponding to positives instances in the training data, and the negative edges corresponding to negative instances in the training data;

estimating importance of user-item interactions via graph conductance based on the user-item graph, wherein the estimating importance of user-item interactions via graph conductance based on the user-item graph comprises:

estimating a hardness score associated with each of the negative instances by calculating an effective conductance corresponding to each negative edge, and smoothing the hardness score associated with each of the negative instances using graph propagation;

measuring importance of the training data via sample hardness using a pre-trained pilot model; and generating a subsampling rate based on the importance estimated from the user-item graph and the importance measured by the pre-trained pilot model.

8. The system of claim 7, wherein the smoothing the hardness score associated with each of the negative instances using graph propagation further comprises:

determining an average effective conductance associated with neighboring negative edges of each negative edge; and calculating, for each negative edge, a weighted sum of the average effective conductance and a corresponding effective conductance.

9. The system of claim 7, wherein the measuring importance of the training data via sample hardness using a pre-trained pilot model further comprises:

generating a hardness score associated with each negative instance in the training data using the pre-trained pilot model; and smoothing the hardness score associated with each of the negative instances.

10. The system of claim 7, wherein the generating a subsampling rate based on the importance estimated from the user-item graph and the importance measured by the pre-trained pilot model further comprises:

determining a final hardness score associated with each negative instance in the training data based on a corresponding smoothed hardness score determined based on the user-item graph and a corresponding smoothed hardness score determined by the pre-trained pilot model; and generating the subsampling rate of negative instances in the training data based on the final hardness score associated with each of the negative instances.

11. The system of claim 7, the operations further comprising:

subsampling negative instances in the training data based on the subsampling rate.

12. The system of claim 11, the operations further comprising:

training an offline recommendation model using positive instances in the training data and the subsampled negative instances.

13. A non-transitory computer-readable storage medium, storing computer-readable instructions that upon execution by a processor cause the processor to implement operations, the operation comprising:

constructing a user-item graph associated with training data, wherein the constructing a user-item graph associated with training data comprises constructing a bipartite graph from the training data, the bipartite graph comprises positive edges and negative edges, the positive edges corresponding to positives instances in the training data, and the negative edges corresponding to negative instances in the training data;

estimating importance of user-item interactions via graph conductance based on the user-item graph, wherein the estimating importance of user-item interactions via graph conductance based on the user-item graph comprises:

estimating a hardness score associated with each of the negative instances by calculating an effective conductance corresponding to each negative edge, and smoothing the hardness score associated with each of the negative instances using graph propagation;

measuring importance of the training data via sample hardness using a pre-trained pilot model; and generating a subsampling rate based on the importance estimated from the user-item graph and the importance measured by the pre-trained pilot model.

14. The non-transitory computer-readable storage medium of claim 13, wherein the smoothing the hardness score associated with each of the negative instances using graph propagation further comprises:

determining an average effective conductance associated with neighboring negative edges of each negative edge; and calculating, for each negative edge, a weighted sum of the average effective conductance and a corresponding effective conductance.

15. The non-transitory computer-readable storage medium of claim 13, wherein the measuring importance of the training data via sample hardness using a pre-trained pilot model further comprises:

generating a hardness score associated with each negative instance in the training data using the pre-trained pilot model; and smoothing the hardness score associated with each of the negative instances.

16. The non-transitory computer-readable storage medium of claim 13, wherein the generating a subsampling rate based on the importance estimated from the user-item graph and the importance measured by the pre-trained pilot model further comprises:

determining a final hardness score associated with each negative instance in the training data based on a corresponding smoothed hardness score determined based on the user-item graph and a corresponding smoothed hardness score determined by the pre-trained pilot model; and generating the subsampling rate of negative instances in the training data based on the final hardness score associated with each of the negative instances.

17. The non-transitory computer-readable storage medium of claim 13, the operations further comprising:

subsampling negative instances in the training data based on the subsampling rate.

18. The non-transitory computer-readable storage medium of claim 17, the operations further comprising:

training an offline recommendation model using positive instances in the training data and the subsampled negative instances.

* * * * *